United States Patent
Guo et al.

(10) Patent No.: US 11,044,408 B2
(45) Date of Patent: Jun. 22, 2021

(54) MULTI-CAMERA ZOOMING METHOD, MOBILE TERMINAL AND STORAGE MEDIUM

(71) Applicant: BEIJING XIAOMI MOBILE SOFTWARE CO., LTD., Beijing (CN)

(72) Inventors: Yi Guo, Beijing (CN); Zifei Dou, Beijing (CN); Peng Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/515,001

(22) Filed: Jul. 17, 2019

(65) Prior Publication Data

US 2020/0092486 A1 Mar. 19, 2020

(30) Foreign Application Priority Data

Sep. 18, 2018 (CN) .......................... 201811090146.4

(51) Int. Cl.
*H04N 5/232* (2006.01)

(52) U.S. Cl.
CPC ..... *H04N 5/23296* (2013.01); *H04N 5/23245* (2013.01); *H04N 5/232935* (2018.08)

(58) Field of Classification Search
CPC ................................................ H04N 5/23296
See application file for complete search history.

(56) References Cited

U.S. PATENT DOCUMENTS

| 10,616,549 B2* | 4/2020 | Park .................. H04N 5/23219 |
| 2007/0024737 A1* | 2/2007 | Nakamura .......... H04N 5/23241 |
| | | 348/335 |
| 2011/0080487 A1* | 4/2011 | Venkataraman ....... H04N 5/349 |
| | | 348/218.1 |
| 2011/0085015 A1 | 4/2011 | Jun |
| 2015/0116547 A1* | 4/2015 | Laroia ................ H04N 5/23293 |
| | | 348/240.1 |
| 2015/0205749 A1 | 7/2015 | Whitby-Strevens et al. |
| 2016/0014314 A1 | 1/2016 | Laroia et al. |

(Continued)

FOREIGN PATENT DOCUMENTS

| CN | 105959553 A | 9/2016 |
| CN | 107343190 A | 11/2017 |

(Continued)

OTHER PUBLICATIONS

Supplementary European Search Report in the European application No. 19197395.7, dated Jan. 27, 2020.

*Primary Examiner* — Anthony J Daniels
(74) *Attorney, Agent, or Firm* — Syncoda LLC; Feng Ma

(57) ABSTRACT

A multi-camera zooming method includes: during zooming from an i-th magnification range to an adjacent j-th magnification range, a j-th camera corresponding to the j-th magnification range is selected from n cameras, $1 \leq i \leq n$ and $1 \leq j \leq n$; when the j-th camera is in a non-operating state, a transition camera and a target camera are determined; the transition camera is set as a camera configured to acquire a preview image; the target camera is unloaded from an operating state to the non-operating state and the j-th camera is loaded from the non-operating state to the operating state; and the camera configured to acquire the preview image is switched from the transition camera to the j-th camera.

15 Claims, 16 Drawing Sheets

(56) References Cited

U.S. PATENT DOCUMENTS

| | | |
|---|---|---|
| 2016/0286120 A1 | 9/2016 | Kuo |
| 2017/0244906 A1 | 8/2017 | Lee et al. |
| 2017/0359494 A1 | 12/2017 | Zhou et al. |
| 2018/0070010 A1 | 3/2018 | Wang et al. |
| 2018/0232333 A1 | 8/2018 | Whitby-Strevens et al. |
| 2018/0332223 A1* | 11/2018 | Lin ................. H04N 5/2351 |
| 2019/0068893 A1* | 2/2019 | Kim ................ H04N 5/23245 |
| 2019/0241123 A1 | 8/2019 | Yan et al. |
| 2019/0243798 A1 | 8/2019 | Whitby-Strevens et al. |
| 2019/0297275 A1* | 9/2019 | Lee ................ H04N 5/23296 |
| 2020/0358954 A1* | 11/2020 | Wang ................... H04N 9/09 |

FOREIGN PATENT DOCUMENTS

| | | |
|---|---|---|
| CN | 107800961 A | 3/2018 |
| CN | 107948508 A | 4/2018 |
| CN | 108391035 A | 8/2018 |

\* cited by examiner

MULTI-CAMERA ZOOMING METHOD, MOBILE TERMINAL AND STORAGE MEDIUM

CROSS-REFERENCE TO RELATED APPLICATION

This application claims priority to Chinese Patent Application No. 201811090146.4 filed on Sep. 18, 2018, the disclosure of which is hereby incorporated by reference in its entirety.

BACKGROUND

During photographing, a camera zooms at first (namely regulating a focal length) and then photographs. The focal length is a distance between a central point of a lens and a sharp image formed on a sensor plane.

Because a zooming range of a single camera is always limited, for meeting focal length requirements of multiple application scenarios, another camera is added to a mobile terminal to form double cameras. In a mobile terminal adopting dual cameras, one camera defaults to serve as a main camera and the main camera is applied to a daily scenario; and the other camera serves as an auxiliary camera. A focal length of the auxiliary camera is different from that of the main camera. When an object is photographed through zooming, a control chip in the mobile terminal controls a zooming process and directly switches a focal length of the main camera to the focal length of the auxiliary camera. The zooming process is smooth and a preview picture does not bounce.

SUMMARY

In some special application scenarios, the imaging effect of the double cameras is still poorer than what a user may desire. Therefore, a camera is added on the basis of double cameras to meet a requirement of the user. The inventors of the present disclosure have recognized that subject to a hardware limit of a present mobile terminal, transmission of only two paths of data can be simultaneously supported, that is, a control chip can simultaneously support only two cameras in an operating state and cannot simultaneously support smooth zooming of more than three cameras.

Embodiments of the present disclosure provide a multi-camera zooming method, mobile terminal and storage medium, which can at least solve the technical problem that, during zooming of multiple cameras, because transmission of only two paths of data can be simultaneously supported under a hardware limit, smooth zooming of more than three cameras cannot be simultaneously supported.

According to an aspect of the present disclosure, a multi-camera zooming method is provided, which can be applied to a mobile terminal, the mobile terminal including n cameras and an image processor connected with the n cameras and the image processor simultaneously supporting m cameras in an operating state, where n>m≥2, the method includes: during zooming from an i-th magnification range to an adjacent j-th magnification range, a j-th camera corresponding to the j-th magnification range is selected from the n cameras, where 1≤i≤n and 1≤j≤n; when the j-th camera is in a non-operating state, a transition camera and target camera are determined from the m cameras in the operating state; the transition camera is set as a camera configured to acquire a preview image; the target camera is unloaded from the operating state to the non-operating state and the j-th camera is loaded from the non-operating state to the operating state; and the camera configured to acquire the preview image is switched from the transition camera to the j-th camera.

In some embodiments, a default camera from the m cameras in the operating state may be determined as the transition camera; or an i-th camera, corresponding to the i-th magnification range, from the m cameras in the operating state may be determined as the transition camera.

When m=2, the operation that the target camera from the m cameras in the operating state is determined may include that: the another camera other than the transition camera, from the m cameras in the operating state is determined as the target camera.

Herein, the mobile terminal may include a first camera U, a second camera W, a third camera T and a fourth camera F.

In case of zooming from low to high magnification ranges, during zooming from a second magnification range to a third magnification range, the j-th camera may be the third camera T, the transition camera may be the second camera W and the target camera may be the first camera U; and during zooming from the third magnification range to a fourth magnification range, the j-th camera may be the fourth camera F, the transition camera may be the second camera W and the target camera may be the third camera T.

In case of zooming from the high to low magnification ranges, during zooming from the fourth magnification range to the third magnification range, the j-th camera may be the third camera T, the transition camera may be the second camera W and the target camera may be the fourth camera F; and during zooming from the second magnification range to a first magnification range, the j-th camera may be the first camera U, the transition camera may be the second camera W and the target camera may be the third camera T.

Herein, the first magnification range may correspond to the first camera U, the second magnification range may correspond to the second camera W, the third magnification range may correspond to the third camera T and the fourth magnification range may correspond to the fourth camera F.

When m is an integer larger than 2, the operation that the target camera from the m cameras in the operating state is determined may include that: the camera loaded earliest from the m-1 cameras in the operating state other than the transition camera, is determined as the target camera.

When m is an integer larger than 2, each camera may correspond to a respective magnification range, and the operation that the target camera from the m cameras in the operating state is determined may include that: the camera, of which the magnification range is farthest from the j-th magnification range, from the m-1 cameras in the operating state, other than the transition camera, is determined as the target camera.

According to another aspect of the present disclosure, a mobile terminal is provided, the mobile terminal includes n cameras and an image processor connected with the n cameras and the image processor simultaneously supporting m cameras in an operating state, where n and m are integers and n>m≥2, the image processor is configured to: during zooming from an i-th magnification range to an adjacent j-th magnification range, select a j-th camera corresponding to the j-th magnification range from the n cameras, where 1≤i≤n and 1≤j≤n; when the j-th camera is in a non-operating state, determine a transition camera and target camera from the m cameras in the operating state; set the transition camera as a camera configured to acquire a preview image; and unload the target camera from the operating state to the non-operating state and load the j-th camera from the non-operating state to the operating state, switch the camera configured to acquire the preview image from the transition camera to the j-th camera.

In some embodiments, the image processor may be further configured to determine a default camera from the m cameras in the operating state as the transition camera; or the determination portion may be further configured to determine an i-th camera, corresponding to the i-th magnification range, from the m cameras in the operating state as the transition camera.

When m=2, the image processor may be configured to determine the other camera other than the transition camera, from the m cameras in the operating state as the target camera.

Herein, the mobile terminal may include a first camera U, a second camera W, a third camera T and a fourth camera F.

In case of zooming from low to high magnification ranges, during zooming from a second magnification range to a third magnification range, the j-th camera may be the third camera T, the transition camera may be the second camera W and the target camera may be the first camera U; and during zooming from the third magnification range to a fourth magnification range, the j-th camera may be the fourth camera F, the transition camera may be the second camera W and the target camera may be the third camera T.

In case of zooming from the high to low magnification ranges, during zooming from the fourth magnification range to the third magnification range, the j-th camera may be the third camera T, the transition camera may be the second camera W and the target camera may be the fourth camera F; and during zooming from the second magnification range to a first magnification range, the j-th camera may be the first camera U, the transition camera may be the second camera W and the target camera may be the third camera T.

Herein, the first magnification range may correspond to the first camera U, the second magnification range may correspond to the second camera W, the third magnification range may correspond to the third camera T and the fourth magnification range may correspond to the fourth camera F.

When m is an integer larger than 2, the image processor may be configured to determine the camera loaded earliest from the m-1 cameras in the operating state other than the transition camera, as the target camera.

When m is an integer larger than 2, each camera may correspond to a respective magnification range, and the image processor may be configured to determine the camera, of which the magnification range is farthest from the j-th magnification range from the m-1 cameras in the operating state, other than the transition camera, as the target camera.

According to another embodiment of the present disclosure, a non-transitory computer-readable storage medium is provided, the non-transitory computer-readable storage medium may be stored thereon at least one instruction which may be loaded and executed by a processor to implement the abovementioned multi-camera zooming method.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
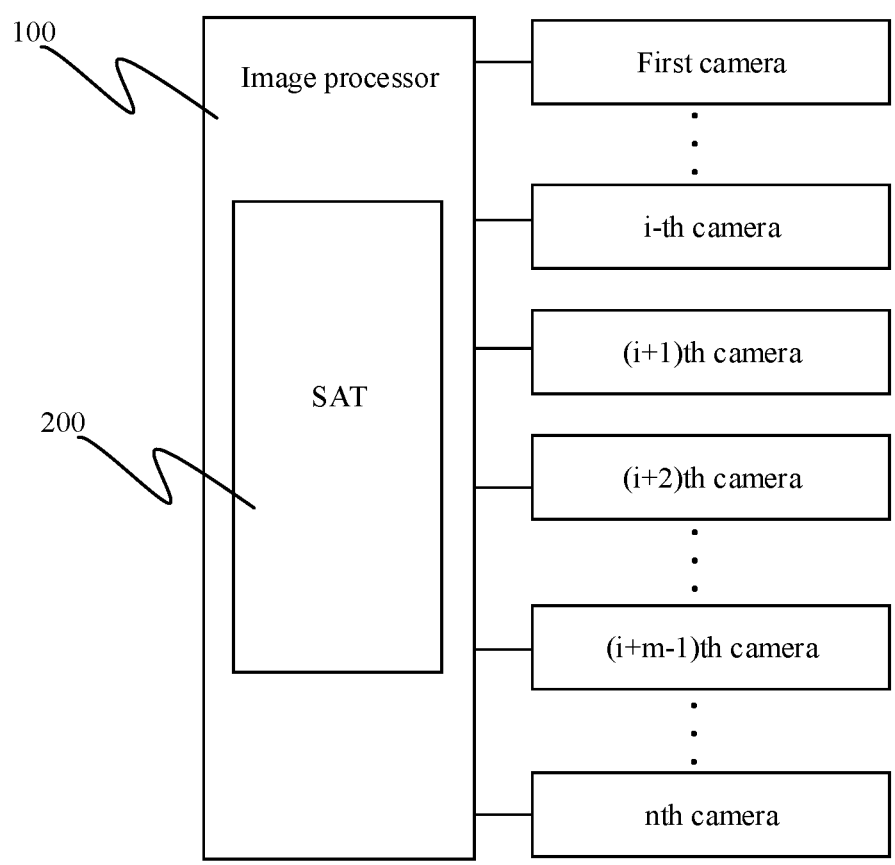
FIG. 1 is a schematic diagram illustrating an implementation environment of a multi-camera zooming method, according to some embodiments of the present disclosure.

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings can represent the same or similar elements unless otherwise indicated.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

Zooming refers to a technology of changing a focal length of a camera to acquire a sharper image. There are usually two implementation manners for zooming: optical zooming and digital zooming. Optical zooming is a zooming technology implemented on the basis of physical movement of a lens system. Optical zooming can simultaneously implement magnification of a remote object and pixel increase by a camera, so that an object image is magnified and sharpness of the object image can also be ensured. Digital zooming is a zooming technology implemented on the basis of a difference algorithm. Digital zooming refers to that the camera can magnify the remote object and perform sharpness processing on the magnified object image through the difference algorithm. Digital zooming has a certain limit to sharpness processing over the object image and an imaging effect of digital zooming is poorer than an imaging effect of optical zooming.

In addition, zoom lens and prime lens can usually be mentioned for photographic. The zoom lens refers to a lens capable of implementing optical zooming, that is, a camera can regulate its own focal length to change the magnification according to a requirement. The prime lens refers to a lens incapable of implementing optical zooming, that is, the focal length of the camera is fixed. An image of an object can be changed only by changing a shooting position or by digital zooming.

Optical zooming can achieve a good imaging effect. However, an optical zooming camera is usually relatively bulky and inconsistent with a present design requirement of mobile terminals. For consistency with the design requirement of light and thin structures of mobile terminals, a design solution of combining a prime lens and digital zooming is mainly adopted for a mobile terminal at present. In order to ensure that, after a mobile terminal magnifies an object, an object image can still be kept sharp, cameras with different focal lengths are added to the mobile terminal in a related art. For example, two, three, four and even more cameras of different types are simultaneously arranged on a mobile phone. During zooming of the mobile terminal, the cameras with different focal length performance can be switched to change a zooming ratio. In the present disclosure, the number of cameras on the mobile terminal is more than two, that is, the mobile terminal is wider in zooming range and a shot image has a better effect.

Multiple cameras of different types are arranged on a mobile terminal. These cameras have different physical performance, so that these cameras have different physical magnification ranges. However, these physical magnification ranges can also be intersected and a relatively proper software magnification range is usually required to be set for each camera through software. For example, three cameras have different physical performance, each of them has a physical magnification range with relatively high performance and these physical magnification ranges are intersected to a certain extent. A relatively good software magnification range of each camera can be set through the software of the terminal and the three magnification ranges are continuous. For example, the three magnification ranges are [1×~2×), [2×~5×) and [5~6×).

Some typical image processors can simultaneously support only two cameras in an operating state. When there are three, four or more cameras, part of the cameras are in a non-operating state. When a mobile terminal is required to zoom to a certain magnification range and the camera corresponding to the magnification range is in the non-operating state, the camera in the non-operating state cannot output a preview image to an image processor, which causes a blank screen phenomenon of a preview picture displayed in a zooming process.

According to the embodiments of the present disclosure, the problem that a mobile terminal is provided with more than two cameras, but an image processor (image signal processor) can simultaneously support only two cameras in an operating state and, when the mobile terminal zooms to a camera in a non-operating state, a preview picture can suddenly change to a blank screen to make it impossible to implement smooth switching during zooming of multiple cameras can be solved.

In the embodiments of the present disclosure, the mobile terminal can be a device providing a photographing and/or camera shooting function for a user, a handheld device with a wireless connection function or another processing device connected to a wireless modem, for example, a digital camera, a digital single lens reflex, a mobile phone (or called a "cell" phone) and a smart phone, and can be portable, pocket, handheld and wearable devices (for example, a smart watch), a tablet computer, a Personal Computer (PC), a Personal Digital Assistant (PDA), a Point of Sales (POS), a vehicular computer, an unmanned aerial vehicle, a camera drone and the like.

In some embodiments of the present disclosure, the mobile terminal includes n cameras, an image processor connected with the n cameras and a Central Processing Unit (CPU) connected with the image processor. The image processor can simultaneously support only m cameras in an operating state, where $n>m\geq 2$.

FIG. 1 is a schematic diagram illustrating an implementation environment of a multi-camera zooming method, according to some embodiments of the present disclosure. In FIG. 1, there are n cameras and an image processor 100. The n cameras are connected to the image processor 100. Under a limit of a hardware circuit, the image processor 100 can simultaneously support m cameras in an operating state, and the m cameras can acquire and send preview images to the image processor 100. The image processor 100 can be configured to transmit a zooming command and the zooming command can be configured to select a camera corresponding to the zooming. One or more program codes can be stored in the image processor 100, the program codes are configured to implement the multi-camera zooming method in the embodiments of the present disclosure and the program code can be a Spatial Alignment Transition (SAT) 200. The SAT 200 is a logical module implemented by a software code. That is, the SAT 200 is configured to select, according to a zooming requirement, the corresponding zoom camera to acquire the preview image and display the acquired preview image on the mobile terminal.

The various device components, blocks, or portions can have modular configurations, or are composed of discrete components, but nonetheless can be referred to as "modules" in general. In other words, the "modules" referred to herein can or cannot be in modular forms.

Figure 2:
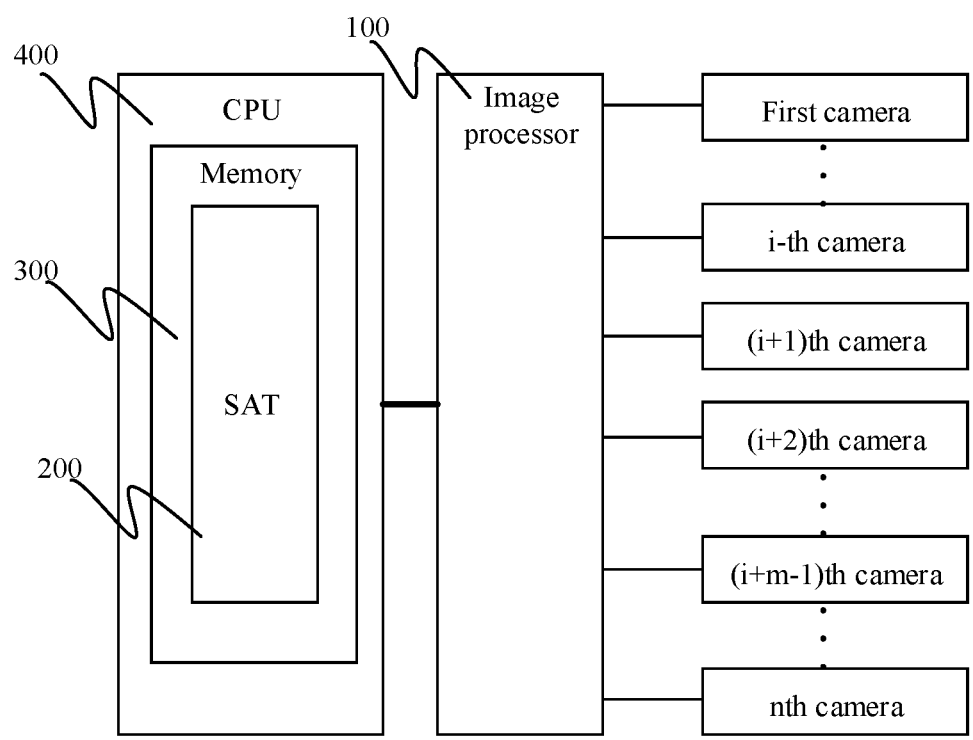
FIG. 2 is a schematic diagram illustrating an implementation environment of a multi-camera zooming method, according to some embodiments of the present disclosure.

FIG. 2 is a schematic diagram illustrating an implementation environment of a multi-camera zooming method, according to some embodiments of the present disclosure. In FIG. 2, there are n cameras, an image processor 100 and a CPU 400. The n cameras are connected to the image processor 100. Under a limit of a hardware circuit, the image processor 100 can simultaneously support m cameras in an operating state, and the m cameras can acquire and input preview images to the image processor 100. The CPU 400 can be configured to transmit a zooming command to the image processor 100 and the zooming command can be configured to select a camera corresponding to the zooming through the image processor 100. The CPU 400 includes a memory 300. The memory 300 is configured to store one or more program codes, the program codes are configured to implement the multi-camera zooming method and the program code may be an SAT 200.

The implementation environment of the multi-camera zooming method provided by the present disclosure can be any one of the two implementation environments described above and will not be limited in the embodiments.

In some embodiments, an i-th camera corresponds to an i-th magnification range, the magnification range corresponding to each camera is different from the magnification ranges corresponding to every other camera and each camera has relatively high focusing performance in its own magnification range. Schematically:

a first camera→a first magnification range, for example, 0.5×-1×;

a second camera→a second magnification range, for example, 1×-2×;

a third camera→a third magnification range, for example, 2×-3×;

. . . ; and an nth camera→an nth magnification range, for example, 4×-5×.

In some embodiments, adjacent magnification ranges are continuous.

In some embodiments of the present disclosure, the multiple cameras in the terminal zoom according to an application scenario and the proper camera is selected for focusing according to a zooming magnification range set by a user.

Figure 3:
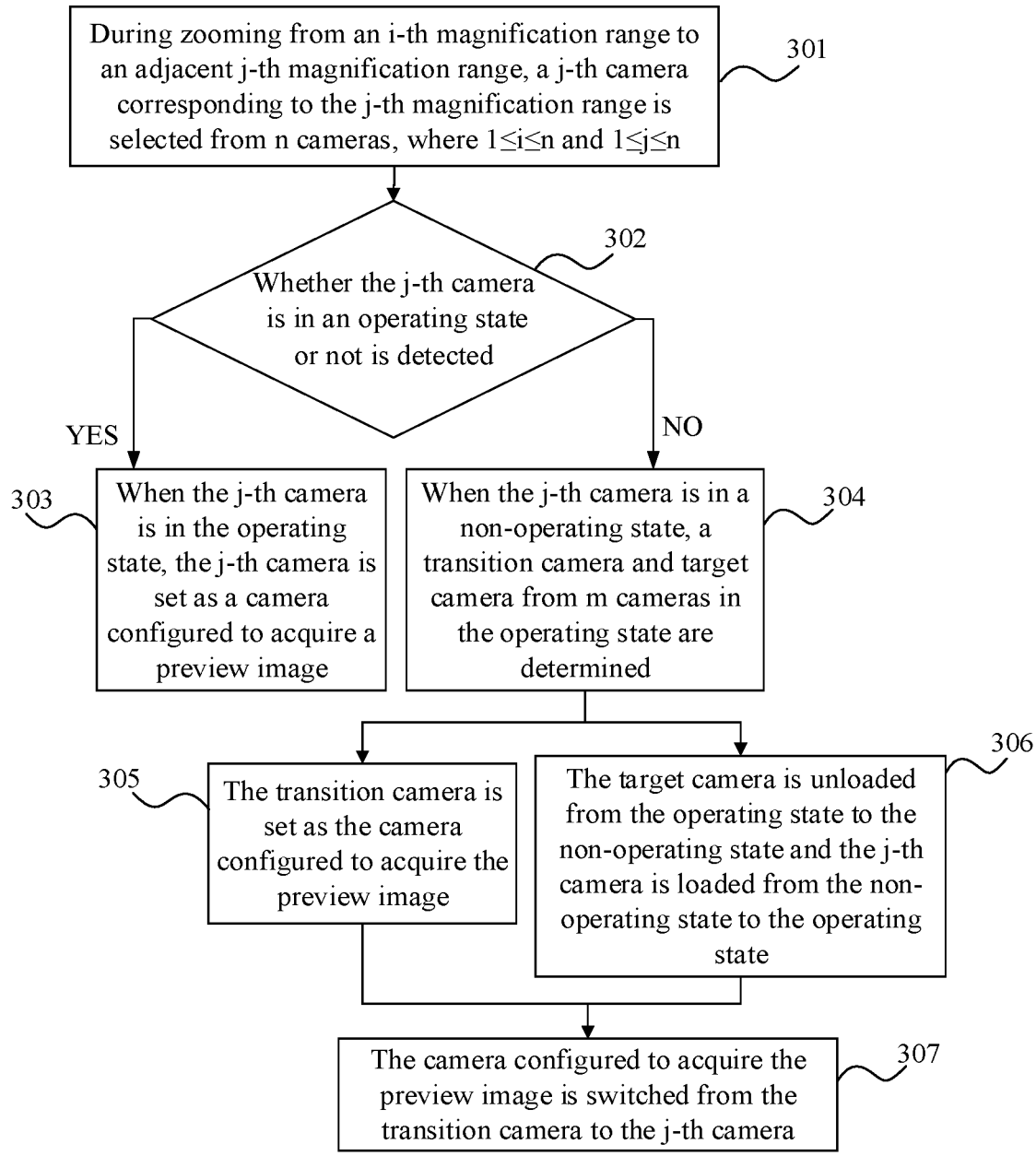
FIG. 3 is a flowchart of a multi-camera zooming method, according to some embodiments of the present disclosure.

FIG. 3 is a flowchart of a multi-camera zooming method, according to some embodiments of the present disclosure. The method can be applied to the mobile terminal shown in FIG. 1 or FIG. 2 and is executed by the image processor or the CPU. The method includes the following blocks.

In Block 301, during zooming from an i-th magnification range to an adjacent j-th magnification range, a j-th camera corresponding to the j-th magnification range is selected from the n cameras, where 1≤i≤n and 1≤j≤n.

The whole zooming focal length is divided into n magnification ranges and each camera in the terminal corresponds to a magnification range which matches with itself. An i-th camera corresponds to the i-th magnification range and two adjacent magnification ranges can be continuous and not intersected. During zooming in a shooting process, the mobile terminal can acquire an expected magnification set by a user (or determined by an automatic focusing program), the expected magnification being a specified zooming magnification. The mobile terminal determines the magnification range matched with the expected magnification to select the camera which will be used firstly.

Zooming from the i-th magnification range to the adjacent j-th magnification range can refer to zooming from a relatively low magnification range to a relatively high magnification range, i.e., zooming from the i-th magnification range to an (i+1)th magnification range, and can also refer to zooming from the relatively high magnification range to the relatively low magnification range, i.e., zooming from the i-th magnification range to an (i−1)th magnification range.

If the expected magnification belongs to the i-th magnification range in a magnification process, the mobile terminal determines that the expected magnification is matched with the i-th magnification range according to the expected magnification, thereby setting the i-th camera as a camera configured to acquire a preview image, and the mobile terminal displays a preview picture on a display screen of the mobile terminal according to the preview image acquired by the i-th camera.

If the expected magnification belongs to the j-th magnification range in the magnification process, the mobile terminal determines that the expected magnification is matched with the j-th magnification range according to the expected magnification, thereby selecting the j-th camera as the camera which will be used firstly.

In Block 302, whether the j-th camera is in an operating state or not is detected.

The mobile terminal reads an operating state value of each camera, the operating state value being configured to represent an operating state of each camera.

When the mobile terminal determines that the j-th camera is in the operating state according to the operating state value, Block 303 is performed; and when the mobile terminal determines that the j-th camera is in a non-operating state according to the operating state value, Block 304 is performed.

In Block 303, when the j-th camera is in the operating state, the j-th camera is set as a camera configured to acquire a preview image.

When the j-th camera is in the operating state, the mobile terminal sets the j-th camera as the camera configured to acquire the preview image to focus the preview image through a focusing algorithm. The mobile terminal displays the preview picture on the display screen according to the preview image acquired by the j-th camera.

In Block 304, when the j-th camera is in a non-operating state, a transition camera and target camera from m cameras in the operating state are determined.

The transition camera is configured as follows. When the j-th camera has yet not been loaded to the operating state, the mobile terminal uses the transition camera to replace the j-th camera and sets the transition camera as the camera configured to acquire the preview image to focus the preview image through the focusing algorithm.

Under a hardware condition limit, the mobile terminal is also required to unload the target camera in the operating state to the non-operating state to vacate a data path, then loads the j-th camera from the non-operating state to the operating state and sets the j-th camera as the camera configured to acquire the preview image to focus the preview image through the focusing algorithm.

In Block 305, the transition camera is set as the camera configured to acquire the preview image.

When the j-th camera has yet not been loaded to the operating state, the mobile terminal uses the transition camera to replace the j-th camera and sets the transition camera as the camera configured to acquire the preview image to focus the preview image through the focusing algorithm.

The mobile terminal displays the preview picture on the display screen by use of the preview image acquired by the transition camera.

In Block 306, the target camera is unloaded from the operating state to the non-operating state and the j-th camera is loaded from the non-operating state to the operating state.

In some embodiments, unloading refers to disabling a data link between the camera and the image processor and loading refers to establishing the data link between the camera and the image processor.

In Block 307, the camera configured to acquire the preview image is switched from the transition camera to the j-th camera.

When the j-th camera is in the operating state, the mobile terminal sets the j-th camera as the camera configured to acquire the preview image to focus the preview image through the focusing algorithm.

The mobile terminal switches the preview image acquired by the transition camera to the preview image acquired by the j-th camera and displays the preview picture on the display screen to implement a smooth zooming process.

From the above, in the method provided in the embodiment, the transition camera is used as a temporary camera configured to acquire the preview image, meanwhile, the target camera is unloaded to the non-operating state, the j-th camera is loaded to the operating state and the camera configured to acquire the preview image is switched from the transition camera to the j-th camera. In such a manner, when the image processor only supports the m cameras in the operating state simultaneously, the n cameras are dynamically switched according to a zooming requirement, so that hardware limit of the image processor is extended and a sudden change in a preview picture in a zooming process is avoided. Therefore, smooth switching of multiple cameras in the zooming process is implemented.

In some embodiments of the present disclosure, the mobile terminal includes n cameras and, under a hardware condition limit, the mobile terminal supports two cameras in an operating state simultaneously. In the two cameras in the operating state, the mobile terminal determines a default camera as a transition camera and determines the other camera other than the transition camera as a target camera.

Figure 4:
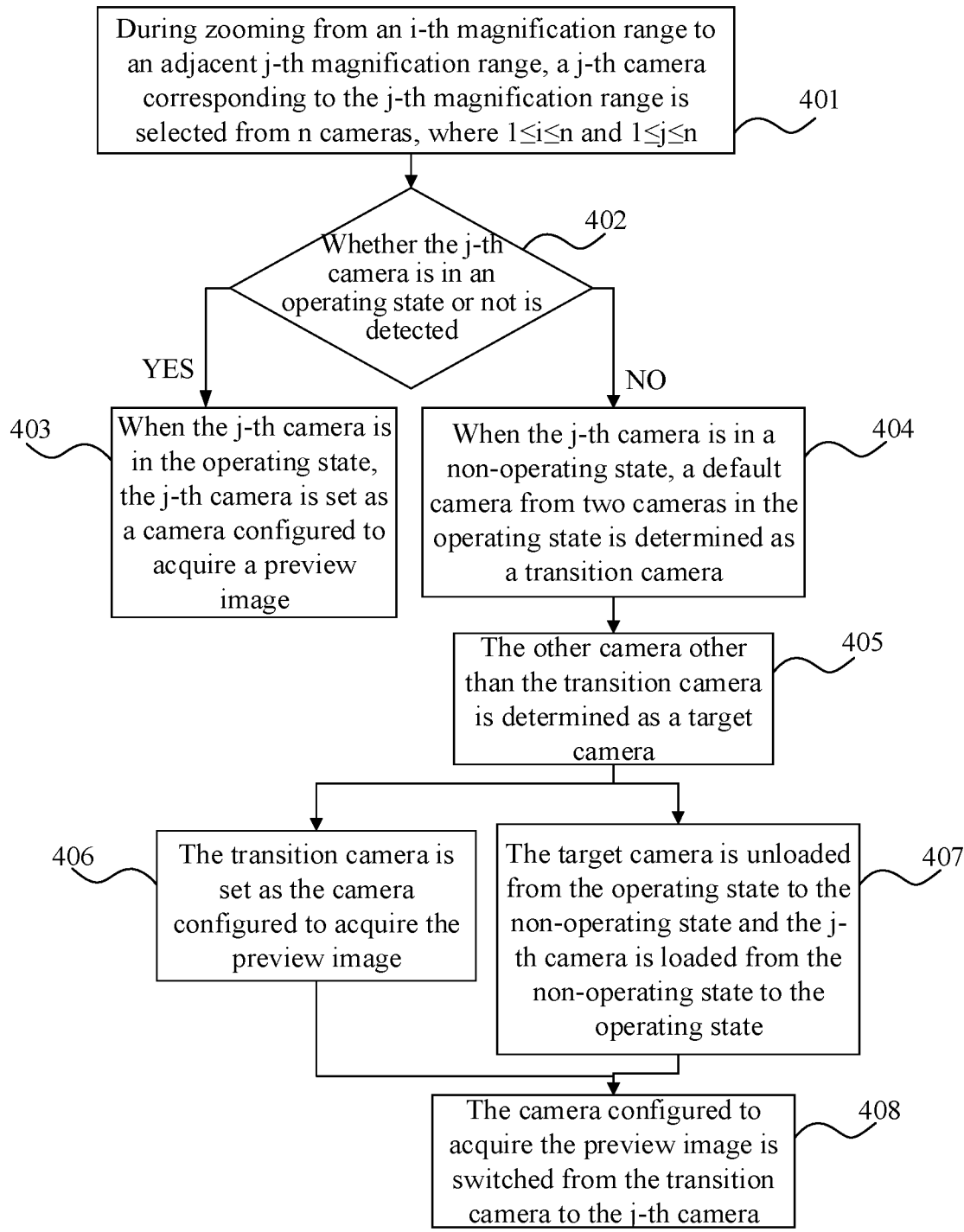
FIG. 4 is a flowchart of a multi-camera zooming method, according to some embodiments of the present disclosure.

FIG. 4 is a flowchart of a multi-camera zooming method, according to some embodiments of the present disclosure. The method can be applied to the mobile terminal shown in FIG. 1 or FIG. 2 and is executed by the image processor or the CPU. The method is as follows.

In Block 401, during zooming from an i-th magnification range to an adjacent j-th magnification range, a j-th camera corresponding to the j-th magnification range is selected from the n cameras, where $1 \leq i \leq n$ and $1 \leq j \leq n$.

When an expected magnification set by a user in a zooming process changes from the i-th magnification range to the adjacent j-th magnification range, the mobile terminal selects the j-th camera as a camera to be used according to the expected magnification.

In Block 402, whether the j-th camera is in an operating state or not is detected.

The mobile terminal reads an operating state value of each camera, the operating state value being configured to represent an operating state of each camera.

When the mobile terminal determines that the j-th camera is in the operating state according to the operating state value, Block 403 is performed; and when the mobile terminal determines that the j-th camera is in a non-operating state according to the operating state value, Block 404 is performed.

In Block 403, when the j-th camera is in the operating state, the j-th camera is set as a camera configured to acquire a preview image.

When the j-th camera is in the operating state, the mobile terminal sets the j-th camera as the camera configured to acquire the preview image to focus the preview image through a focusing algorithm. The mobile terminal displays a preview picture on a display screen according to the preview image acquired by the j-th camera.

In Block 404, when the j-th camera is in a non-operating state, a default camera from the two cameras in the operating state is determined as a transition camera.

Under the hardware condition limit of the mobile terminal, the mobile terminal supports the two cameras in the operating state simultaneously, one camera can be set as a main camera and the main camera defaults to serve as the transition camera.

The transition camera is configured as follows. When the j-th camera has yet not been loaded to the operating state, the mobile terminal uses the transition camera to replace the j-th camera and sets the transition camera as the camera configured to acquire the preview image to focus the preview image through the focusing algorithm.

In Block 405, the other camera other than the transition camera is determined as a target camera.

Since the mobile terminal supports the two cameras in the operating state simultaneously, it is determined by default that the main camera serves as the transition camera and the other camera in the operating state serves as the target camera.

The target camera is configured as follows. Under the hardware condition limit, the mobile terminal unloads the camera in the operating state to the non-operating state to vacate a data path, then loads the j-th camera from the non-operating state to the operating state and sets the j-th camera as the camera configured to acquire the preview image to focus the preview image through the focusing algorithm.

In Block 406, the transition camera is set as the camera configured to acquire the preview image.

When the j-th camera has yet not been loaded to the operating state, the mobile terminal uses the transition camera to replace the j-th camera and sets the transition camera as the camera configured to acquire the preview image to focus the preview image through the focusing algorithm.

The mobile terminal displays the preview picture on the display screen by use of the preview image acquired by the transition camera.

In Block 407, the target camera is unloaded from the operating state to the non-operating state and the j-th camera is loaded from the non-operating state to the operating state.

In Block 408, the camera configured to acquire the preview image is switched from the transition camera to the j-th camera.

When the j-th camera is in the operating state, the mobile terminal sets the j-th camera as the camera configured to acquire the preview image to focus the preview image through the focusing algorithm.

The mobile terminal switches the preview image acquired by the transition camera to the preview image acquired by the j-th camera and displays the preview picture on the display screen to implement a smooth zooming process.

From the above, in the method provided by the embodiment, the transition camera is used as a temporary camera configured to acquire the preview image, meanwhile, the target camera is unloaded to the non-operating state, the j-th camera is loaded to the operating state and the camera configured to acquire the preview image is switched from the transition camera to the j-th camera. In such a manner, when the image processor only supports the m cameras in the operating state simultaneously, the n cameras are dynamically switched according to a zooming requirement, so that hardware limit of the image processor is extended and a sudden change in a preview picture in a zooming process is avoided. Therefore, smooth switching of multiple cameras in the zooming process is implemented.

In the method provided by the embodiment, under the hardware condition limit, the mobile terminal supports the two cameras in the operating state simultaneously and determines the default camera as the transition camera. The default camera can serve as the main camera and can provide the preview image on the display screen of the mobile terminal during zooming of the mobile terminal and implement a relatively concise judgment logic, thereby avoiding a sudden change phenomenon of the preview picture during zooming of the mobile terminal.

Figure 5:
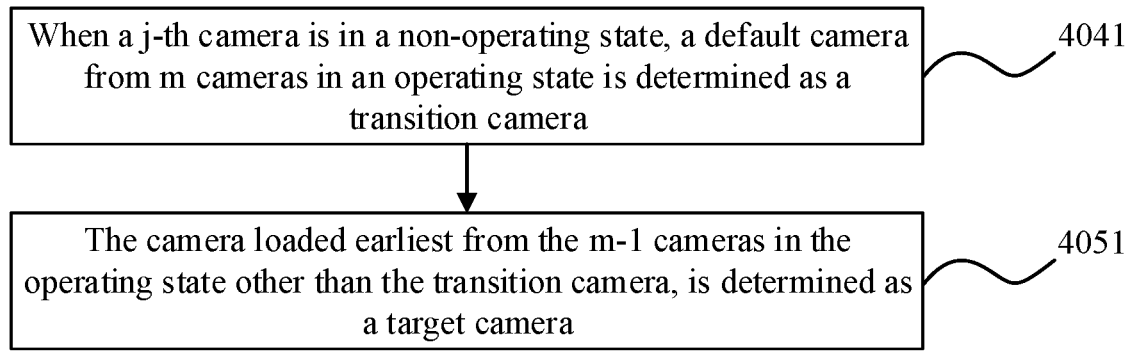
FIG. 5 is a flowchart of a multi-camera zooming method, according to some embodiments of the present disclosure.

In an alternative embodiment based on FIG. 4, m is an integer larger than 2, that is, under the hardware condition limit, the mobile terminal supports m cameras in the operating state simultaneously. As shown in FIG. 5, Block 404 and Block 405 can be replaced with Block 4041 and Block 4051. The replacing blocks are as follows.

In Block 4041, when the j-th camera is in the non-operating state, the default camera from the m cameras in the operating state is determined as the transition camera.

In Block 4051, the camera loaded earliest from the m-1 cameras in the operating state, other than the transition camera, is determined as the target camera.

The mobile terminal can set one camera of the m cameras in the operating state as the main camera, the main camera can default to serve as the transition camera, and thus the target camera is determined from the left m-1 cameras in the operating state.

Loading time lengths of the m cameras in the operating state are different and the camera loaded earliest can be selected as the target camera. There is a high probability that the camera loaded earliest is inapplicable to a practical application scenario after zooming of the mobile terminal. Therefore, it can serve as the target camera. The camera loaded earliest is unloaded from the operating state to the non-operating state.

From the above, in the method provided by the embodiment, the transition camera is used as a temporary camera configured to acquire the preview image, meanwhile, the target camera is unloaded to the non-operating state, the j-th camera is loaded to the operating state and the camera configured to acquire the preview image is switched from the transition camera to the j-th camera. In such a manner, when the image processor only supports the m cameras in the operating state simultaneously, the n cameras are dynamically switched according to a zooming requirement, so that hardware limit of the image processor is extended and a sudden change in a preview picture in a zooming process is avoided. Therefore, smooth switching of multiple cameras in the zooming process is implemented.

In the method provided by the embodiment, under the hardware condition limit, the mobile terminal simultaneously supports the m cameras in the operating state and determines the default camera as the transition camera. The default camera can serve as the main camera to provide the preview image on the display screen of the mobile terminal during zooming of the mobile terminal, thereby avoiding the sudden change phenomenon of the preview picture during zooming of the mobile terminal.

In the method provided by the embodiment, the mobile terminal determines the target camera from the left m-1 cameras in the operating state, the target camera being the camera loaded earliest. Because there is a high probability that the camera loaded earliest is inapplicable to the practical application scenario after zooming of the mobile terminal, it can serve as the target camera.

Figure 6:
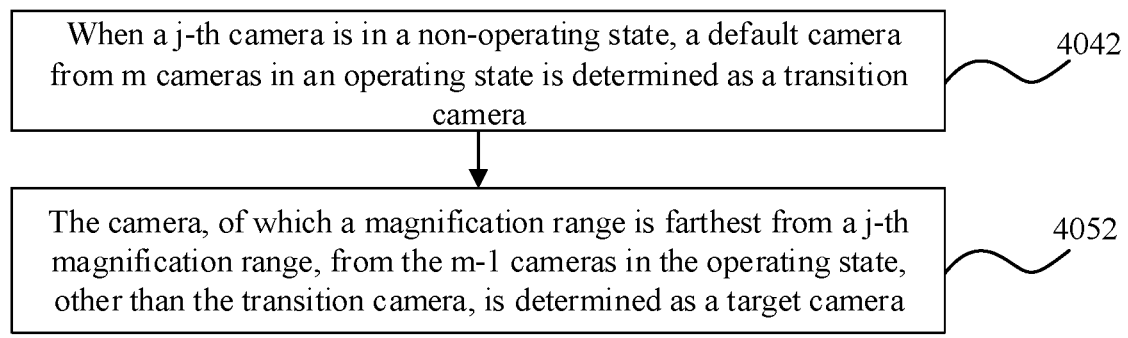
FIG. 6 is a flowchart of a multi-camera zooming method, according to some embodiments of the present disclosure.

In another alternative embodiment based on FIG. 4, m is an integer larger than 2, that is, under the hardware condition limit, the mobile terminal simultaneously supports the m cameras in the operating state. As shown in FIG. 6, Block 404 and Block 405 can be replaced with Block 4042 and Block 4052. The replacing blocks are as follows.

In Block 4042, when the j-th camera is in the non-operating state, the default camera from the m cameras in the operating state is determined as the transition camera.

In Block 4052, the camera, of which a magnification range is farthest from the j-th magnification range, from the m-1 cameras in the operating state, other than the transition camera, is determined as the target camera.

The mobile terminal can set one camera of the m cameras in the operating state as the main camera, the main camera can default to serve as the transition camera, and thus the target camera is determined from the m-1 cameras in the operating state.

Each camera in the mobile terminal corresponds to a magnification range. The mobile terminal selects the j-th camera as the camera which will be used firstly and the j-th camera corresponds to the j-th magnification range. The magnification range with a maximum difference with the j-th magnification range is farthest from the j-th magnification range. According to the practical application scenario, a preview image acquired by the camera corresponding to the magnification range farthest from the j-th magnification range is greatly different from the preview image acquired by the j-th camera. When the mobile terminal switches the two preview images, the displayed preview picture is obviously different, therefore, there can induce the phenomenon that the preview picture bounces or is blurry. Therefore, the camera corresponding to the magnification range farthest from the j-th magnification range is inapplicable to the practical application scenario and the camera is determined as the target camera.

From the above, in the method provided by the embodiment, the transition camera is used as a temporary camera configured to acquire the preview image, meanwhile, the target camera is unloaded to the non-operating state, the j-th camera is loaded to the operating state and the camera configured to acquire the preview image is switched from the transition camera to the j-th camera. In such a manner, when the image processor only supports the m cameras in the operating state simultaneously, the n cameras are dynamically switched according to a zooming requirement, so that hardware limit of the image processor is extended and a sudden change in a preview picture in a zooming process is avoided. Therefore, smooth switching of multiple cameras in the zooming process is implemented.

In the method provided by the embodiment, under the hardware condition limit, the mobile terminal simultaneously supports the m cameras in the operating state and determines the default camera as the transition camera. The default camera can serve as the main camera and can provide the preview image on the display screen of the mobile terminal during zooming of the mobile terminal, thereby avoiding the sudden change phenomenon of the preview picture during zooming of the mobile terminal.

In the method provided by the embodiment, the mobile terminal determines the target camera from the left m-1 cameras in the operating state, the target camera being the camera farthest from the j-th magnification range. Because there is a high probability that the camera farthest from the j-th magnification range is inapplicable to the practical application scenario, it can serve as the target camera.

In some other embodiments of the present disclosure, the mobile terminal includes the n cameras and, under the hardware condition limit, the mobile terminal simultaneously supports two cameras in the operating state. In the two cameras in the operating state, the mobile terminal determines one camera as the transition camera and determines the other camera other than the transition camera as the target camera.

Figure 7:
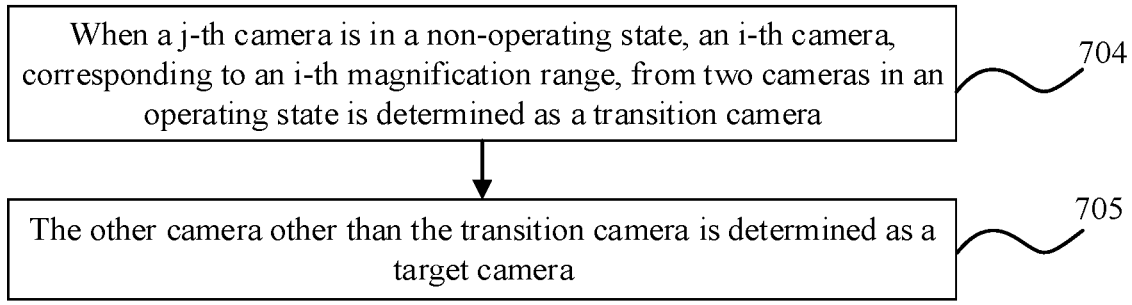
FIG. 7 is a flowchart of a multi-camera zooming method, according to some embodiments of the present disclosure.

In an alternative embodiment based on FIG. 4, as shown in FIG. 7, Block 404 and Block 405 can be replaced with Block 704 and Block 705. The replacing blocks are as follows.

In Block 704, when the j-th camera is in the non-operating state, the i-th camera, corresponding to the i-th magnification range of the two cameras in the operating state is determined as the transition camera.

Under the hardware condition limit of the mobile terminal, the mobile terminal simultaneously supports the two cameras in the operating state and cannot set a fixed camera in the operating state as the transition camera. The transition camera is configured as follows. When the j-th camera has yet not been loaded to the operating state, the mobile terminal uses the transition camera to replace the j-th camera and sets the transition camera as the camera configured to acquire the preview image to focus the preview image through the focusing algorithm.

For avoiding an excessively obvious difference of the preview pictures displayed on the display screen, the mobile terminal, when switching the preview image acquired by the transition camera to the preview image acquired by the j-th camera, can select the i-th camera of which the magnification range is adjacent to the magnification range corresponding to the j-th camera as the transition camera. When the preview images acquired by the transition camera and the j-th camera are displayed, there may no sudden change in the preview picture.

In Block 705, the other camera other than the transition camera is determined as the target camera.

Since the mobile terminal simultaneously supports the two cameras in the operating state, it is determined by default that the i-th camera corresponding to the i-th magnification range serves as the transition camera and the other camera in the operating state serves as the target camera.

The target camera is configured as follows. Under the hardware condition limit, the mobile terminal unloads the target camera in the operating state to the non-operating state to vacate a data path, then loads the j-th camera from the non-operating state to the operating state and sets the j-th camera as the camera configured to acquire the preview image to focus the preview image through the focusing algorithm.

From the above, in the method provided by the embodiment, the transition camera is used as a temporary camera configured to acquire the preview image, meanwhile, the target camera is unloaded to the non-operating state, the j-th camera is loaded to the operating state and the camera configured to acquire the preview image is switched from the transition camera to the j-th camera. In such a manner, when the image processor only supports the m cameras in the operating state simultaneously, the n cameras are dynamically switched according to a zooming requirement, so that hardware limit of the image processor is extended and a sudden change in a preview picture in a zooming process is avoided. Therefore, smooth switching of multiple cameras in the zooming process is implemented.

In the method provided by the embodiment, under the hardware condition limit, the mobile terminal simultaneously supports the two cameras in the operating state and determines the i-th camera corresponding to the i-th magnification range as the transition camera. The transition camera can provide the preview image on the display screen of the mobile terminal during zooming of the mobile terminal, thereby avoiding the sudden change phenomenon of the preview picture during zooming of the mobile terminal.

Figure 8:
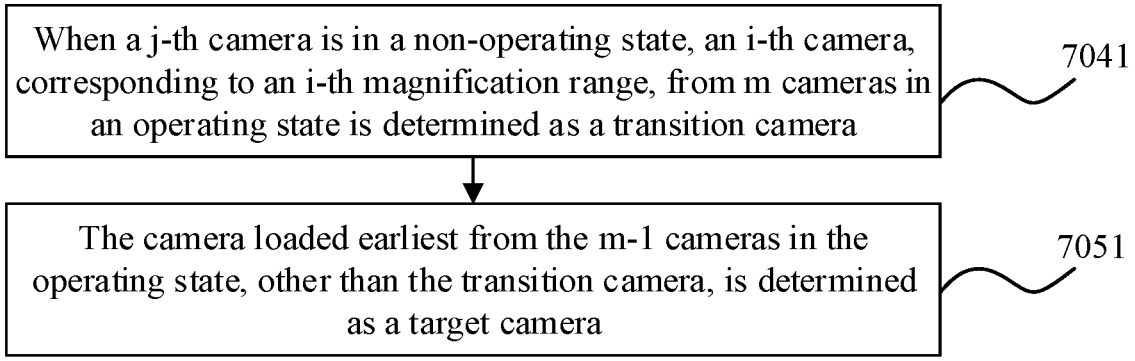
FIG. 8 is a flowchart of a multi-camera zooming method, according to some embodiments of the present disclosure.

In another alternative embodiment based on FIG. 7, as shown in FIG. 8, Block 704 and Block 705 can be replaced with Block 7041 and Block 7051. The replacing blocks are as follows.

In Block 7041, when the j-th camera is in the non-operating state, the i-th camera, corresponding to the i-th magnification range, from the m cameras in the operating state is determined as the transition camera.

In Block 7051, the camera loaded earliest from the m-1 cameras in the operating state, other than the transition camera, is determined as the target camera.

The mobile terminal can set the i-th camera, corresponding to the i-th magnification range, from the m cameras in the operating state as the transition camera, and thus the target camera is determined from the left m-1 cameras in the operating state.

The loading time lengths of the m cameras in the operating state are different and the camera loaded earliest can be selected as a preferred target camera. The camera loaded earliest is inapplicable to the practical application scenario after zooming of the mobile terminal and can serve as the target camera, and the camera loaded earliest is unloaded from the operating state to the non-operating state.

From the above, in the method provided by the embodiment, the transition camera is used as a temporary camera configured to acquire the preview image, meanwhile, the target camera is unloaded to the non-operating state, the j-th camera is loaded to the operating state and the camera configured to acquire the preview image is switched from the transition camera to the j-th camera. In such a manner, when the image processor only supports the m cameras in the operating state simultaneously, the n cameras are dynamically switched according to a zooming requirement, so that hardware limit of the image processor is extended and a sudden change in a preview picture in a zooming process is avoided. Therefore, smooth switching of multiple cameras in the zooming process is implemented.

In the method provided by the embodiment, under the hardware condition limit, the mobile terminal simultaneously supports the m cameras in the operating state and determines the i-th camera corresponding to the i-th magnification range as the transition camera. The transition camera can provide the preview image on the display screen of the mobile terminal during zooming of the mobile terminal, thereby avoiding the sudden change phenomenon of the preview picture during zooming of the mobile terminal.

In the method provided by the embodiment, the mobile terminal determines the target camera from the left m-1 cameras in the operating state, the target camera being the camera loaded earliest. There is a high probability that the camera loaded earliest is inapplicable to the practical application scenario after zooming of the mobile terminal, so that it can serve as the target camera.

Figure 9:
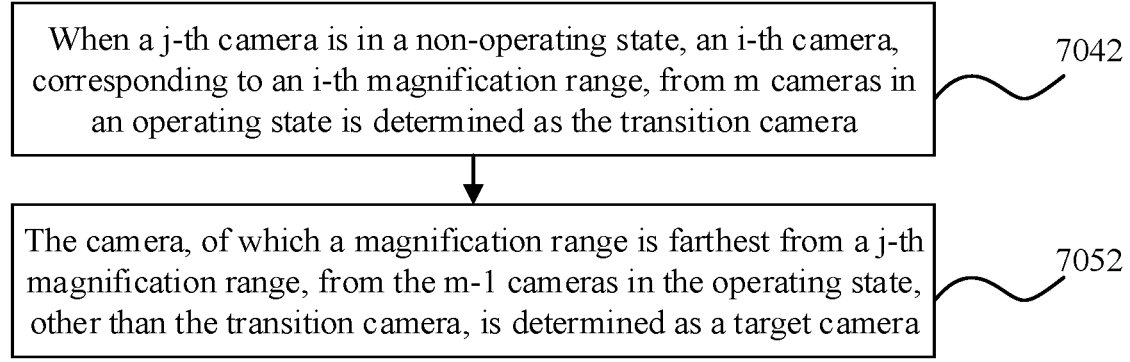
FIG. 9 is a flowchart of a multi-camera zooming method, according to some embodiments of the present disclosure.

In another alternative embodiment based on FIG. 7, as shown in FIG. 9, Block 704 and Block 705 can be replaced with Block 7042 and Block 7052. The replacing blocks are as follows.

In Block 7042, when the j-th camera is in the non-operating state, the i-th camera, corresponding to the i-th magnification range, from the m cameras in the operating state is determined as the transition camera.

In Block 7052, the camera, of which the magnification range is farthest from the j-th magnification range, from the m-1 cameras in the operating state, other than the transition camera, is determined as the target camera.

The mobile terminal can set the i-th camera, corresponding to the i-th magnification range, from the m cameras in the operating state as the transition camera, and thus the target camera is determined from the left m-1 cameras in the operating state.

Each camera in the mobile terminal has a corresponding magnification range. The mobile terminal selects the j-th camera as the camera which will be used firstly and the j-th camera corresponds to the j-th magnification range. The magnification range with a maximum difference with the j-th magnification range is farthest from the j-th magnification range. According to the practical application scenario, the preview image acquired by the camera corresponding to the magnification range farthest from the j-th magnification range is greatly different from the preview image acquired by the j-th camera. When the mobile terminal switches between the two preview images, the displayed preview picture is obviously different and there can induce the phenomenon that the preview picture bounces or is blurry. Therefore, the camera corresponding to the magnification range farthest from the j-th magnification range is inapplicable to the practical application scenario and the camera is determined as the target camera.

From the above, in the method provided by the embodiment, the transition camera is used as a temporary camera configured to acquire the preview image, meanwhile, the target camera is unloaded to the non-operating state, the j-th camera is loaded to the operating state and the camera configured to acquire the preview image is switched from the transition camera to the j-th camera. In such a manner, when the image processor only supports the m cameras in the operating state simultaneously, the n cameras are dynamically switched according to a zooming requirement, so that hardware limit of the image processor is extended and a sudden change in a preview picture in a zooming process is avoided. Therefore, smooth switching of multiple cameras in the zooming process is implemented.

In the method provided by the embodiment, under the hardware condition limit, the mobile terminal simultaneously supports the m cameras in the operating state and determines the i-th camera corresponding to the i-th magnification range as the transition camera. The transition camera can provide the preview image on the display screen of the mobile terminal during zooming of the mobile terminal, thereby avoiding the sudden change phenomenon of the preview picture during zooming of the mobile terminal.

In the method provided by the embodiment, the mobile terminal determines the target camera from the left m-1 cameras in the operating state, the target camera being the camera farthest from the j-th magnification range. There is a high probability that the camera farthest from the j-th magnification range is inapplicable to the practical application scenario, so that it can serve as the target camera.

In a schematic example, the mobile terminal is a mobile phone and the mobile phone includes four cameras. Exemplary descriptions about a multi-camera zooming method for the mobile phone will be made. Under a hardware condition limit of the mobile phone, an image processor can simultaneously support only two cameras in an operating state. The four cameras are a first camera U, a second camera W, a third camera T and a fourth camera F, the second camera W is set by default as a main camera, that is, the main camera defaults to serve as a transition camera, and the other camera in the operating state serves as a target camera.

The first camera U can be an ultra-wide-angle camera and corresponds to a first magnification range, and the first magnification range can be [0.6×, 1×).

The second camera W can be a wide-angle camera and corresponds to a second magnification range, and the second magnification range can be [1×, 2×).

The third camera T can be a telephoto camera and corresponds to a third magnification range, and the third magnification range can be [2×, 5×).

The fourth camera F can be a super telephoto camera and corresponds to a fourth magnification range, and the fourth magnification range can be 5×.

Figure 10:
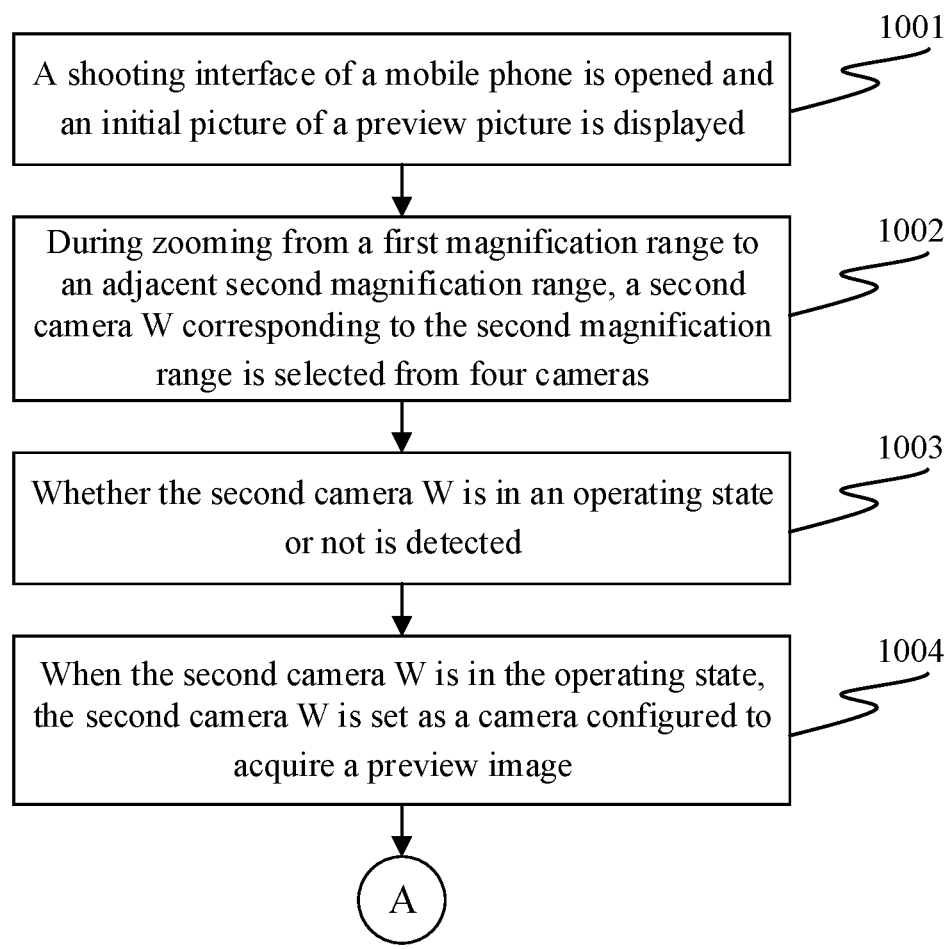
FIG. 10 is a flowchart of a method for zooming from a minimum magnification range to a maximum magnification range in a multi-camera scenario, according to some embodiments of the present disclosure.

FIG. 10 is a flowchart of a method for zooming from a minimum magnification range to a maximum magnification range in a multi-camera scenario, according to some embodiments of the present disclosure. The method is as follows.

In Block 1001, a shooting interface of the mobile phone is opened and an initial picture of a preview picture is displayed on a display screen.

Figure 12:
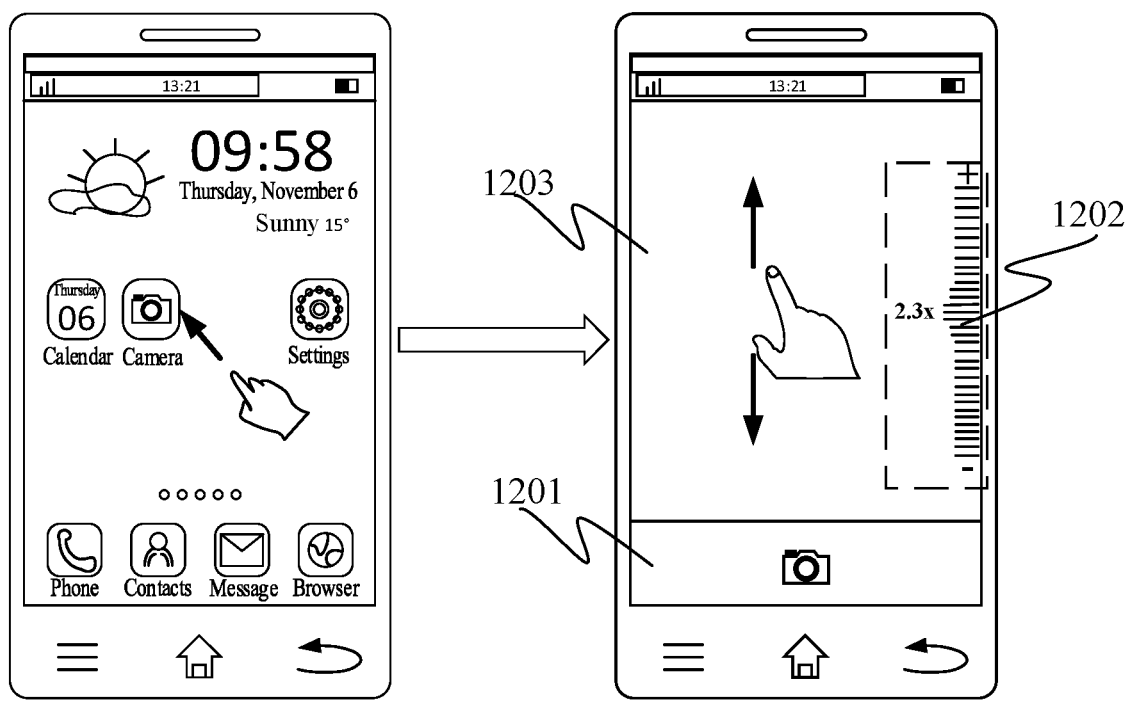
FIG. 12 is a schematic diagram illustrating a shooting function interface of a mobile phone, according to some embodiments of the present disclosure.

As shown in FIG. 12, a user clicks a camera icon on a home interface of the mobile phone to open the shooting interface of the mobile phone. The display screen of the mobile phone includes a camera shooting function region 1201, a zooming data region 1202 and the preview region 1203. The user opens or closes two fingers on the preview region 1203 to form a zooming instruction for the four cameras and the preview region 1203 can display a preview picture during zoom in or zoom out of an image. In some embodiments, the two fingers are opened to form a zoom in instruction and the two fingers are closed to form a zoom out instruction.

In addition, during a zoom in or zoom out operation of the user, the zooming data region 1202 on one side of the display screen of the mobile phone displays a zooming magnification and a data scale corresponding to the zooming magnification.

In case of zooming from low to high magnification ranges, the preview image displayed in the preview region 1203 is gradually magnified, the zooming magnification gradually increases and the corresponding data scale gradually increases from bottom to top. In case of zooming from the high to low magnification ranges, the preview image displayed in the preview region 1203 is gradually reduced, the zooming magnification gradually decreases and the corresponding data scale gradually decreases from top to bottom.

In Block 1002, during zooming from the first magnification range to the adjacent second magnification range, the second camera W corresponding to the second magnification range is selected from the four cameras.

Figure 13:
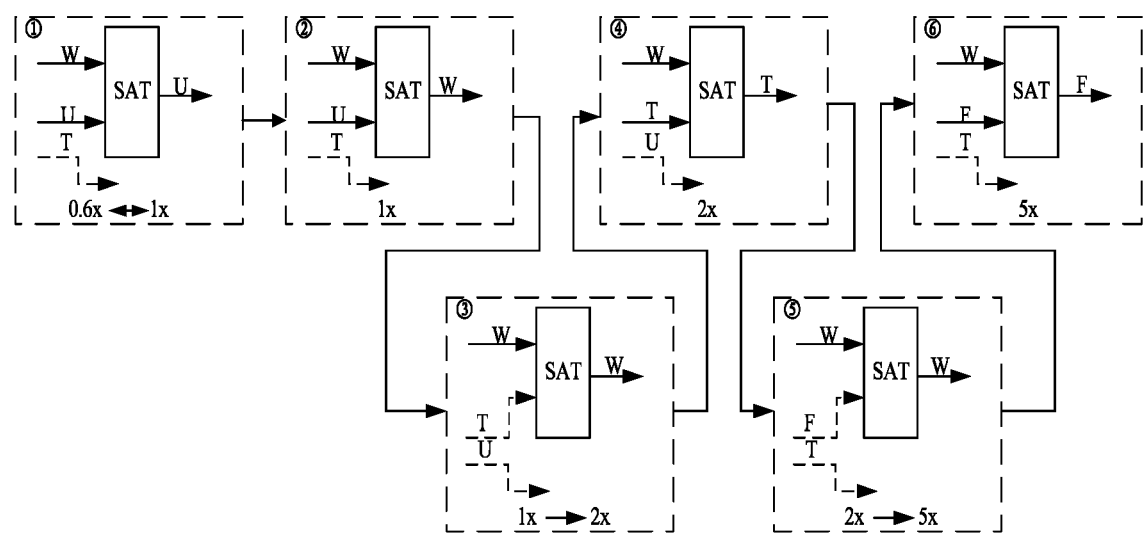
FIG. 13 is a schematic diagram illustrating zooming from a minimum magnification range to a maximum magnification range in a multi-camera scenario, according to some embodiments of the present disclosure.

A moment when the initial picture of the preview picture is displayed is set to be a first moment. At the first moment, an expected magnification of the mobile phone is 0.6×, the expected magnification refers to an expected zooming magnification set by the user. Since the expected magnification 0.6× is matched with the magnification range of the first camera U and the first camera U and the second camera W default to be in an operating state, the mobile phone sets the first camera U as a camera acquiring a preview image and the mobile phone displays the preview picture on the display screen according to the preview image acquired by the first camera U. As shown in FIG. 13, the first moment corresponds to stage ① in FIG. 13.

If the fingers of the user are opened on the preview picture, the expected magnification displayed on the shooting interface of the mobile phone can increase and the data scale increases. The mobile phone acquires a triggering signal according to an action of the fingers of the user and the mobile phone processes the triggering signal to obtain the zooming instruction and obtains an updated expected magnification according to the zooming instruction. If the expected magnification gradually increases from 0.6× but does not reach 1×, it is judged that the updated expected magnification is matched with the first magnification range, thus the first camera U is set as the camera acquiring the preview image, and the mobile phone displays the preview picture on the display screen according to the preview image acquired by the first camera U. If the expected magnification gradually increases from 0.6× and reaches 1×, the mobile phone determines that the expected magnification is matched with the second magnification range, thereby selecting the second camera W as a camera which will be used firstly.

In Block 1003, whether the second camera W is in an operating state or not is detected.

The mobile phone reads an operating state value of each camera, the operating state value being configured to represent an operating state of each camera. In some embodiments, when the mobile phone determines according to the operating state value that the second camera W is in the operating state, Block 1004 is performed.

In Block 1004, when the second camera W is in the operating state, the second camera W is set as the camera configured to acquire the preview image.

When the second camera W is in the operating state, the mobile phone sets the second camera W as the camera configured to acquire the preview image to focus the preview image through a focusing algorithm. The mobile phone displays the preview picture on the display screen according to the preview image acquired by the second camera W. As shown in FIG. 13, it is described in stage ② in FIG. 13 that, when the expected magnification reaches 1×, the second camera W is selected as the camera which will be used firstly.

Figure 11:
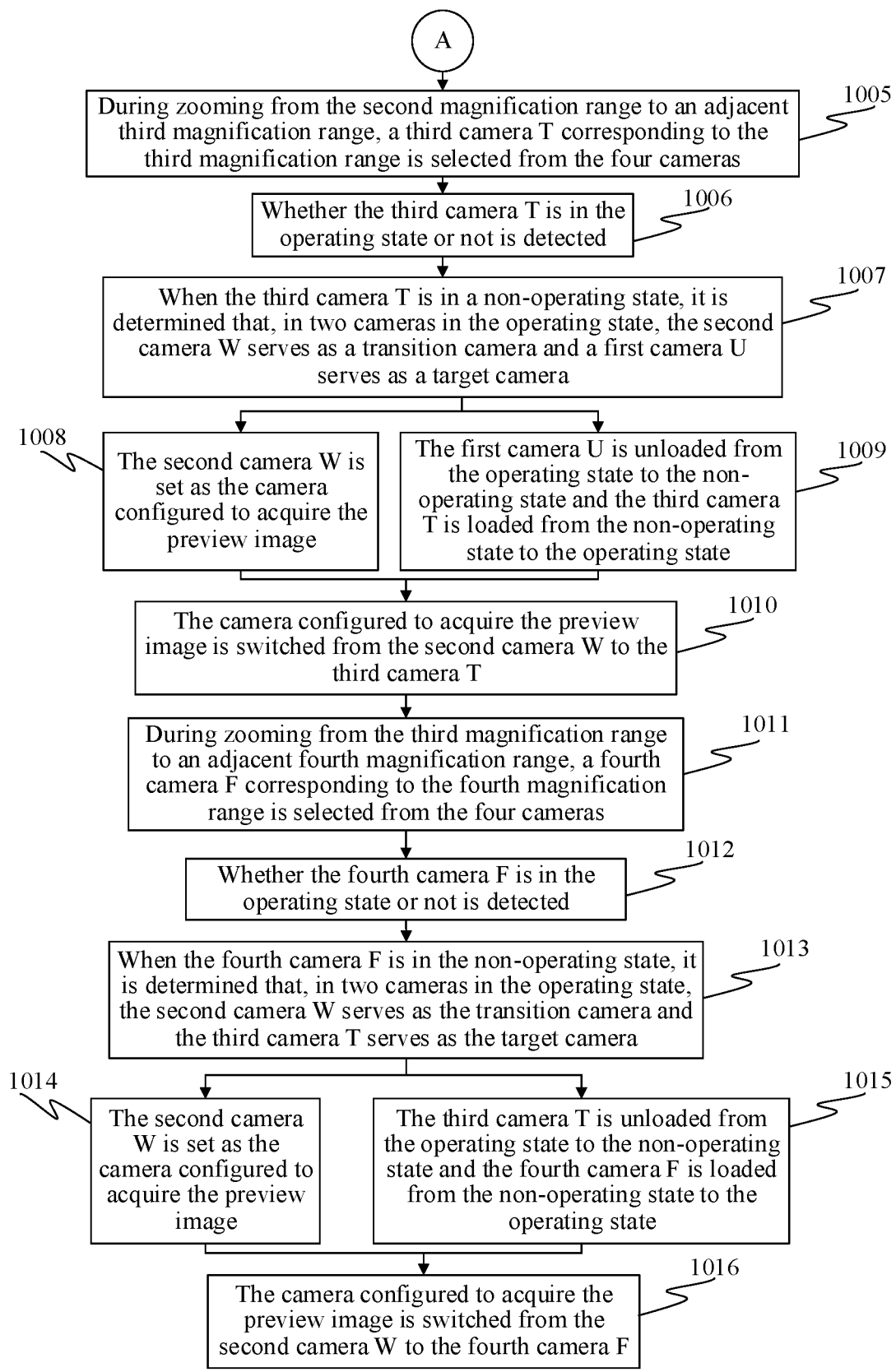
FIG. 11 is a flowchart of a method for zooming from a minimum magnification range to a maximum magnification range in a multi-camera scenario, according to some embodiments of the present disclosure.

FIG. 11 is a flowchart of a method for zooming from a minimum magnification range to a maximum magnification range in a multi-camera scenario, according to some embodiments of the present disclosure. In the method, zooming to the maximum magnification range is continued after the abovementioned blocks. The method is as follows.

In Block 1005, during zooming from the second magnification range to the adjacent third magnification range, the third camera T corresponding to the third magnification range is selected from the four cameras.

There is made such a hypothesis that a moment when the preview picture after zooming from the first magnification range to the adjacent second magnification range is displayed is a second moment.

At the second moment, if the fingers of the user are opened on the preview picture, the expected magnification displayed on the shooting interface of the mobile phone increases and the data scale increases. The mobile phone acquires the triggering signal according to the action of the fingers of the user and the mobile phone processes the triggering signal to obtain the zooming instruction and obtains the expected magnification according to the zooming instruction. If the expected magnification gradually increases from 1× but does not reach 2×, the mobile phone determines that the expected magnification is matched with the second magnification range, thereby selecting the second camera W as the camera which will be used firstly, and the mobile phone sets the second camera W as the camera acquiring the preview image. The mobile phone displays the preview picture on the display screen according to the preview image acquired by the second camera W.

If the expected magnification gradually increases from 1× and reaches 2×, the mobile phone determines that the expected magnification is matched with the third magnification range, thereby selecting the third camera T as the camera which will be used firstly. As shown in FIG. 13, the second moment corresponds to stage ③ in FIG. 13.

In Block 1006, whether the third camera T is in the operating state or not is detected.

The mobile phone reads the operating state value of each camera, the operating state value being configured to represent the operating state of each camera. In some embodiments, when the mobile phone determines according to the operating state value that the third camera T is in a non-operating state, Block 1007 is executed.

In Block 1007, when the third camera T is in a non-operating state, it is determined that, in two cameras in the operating state, the second camera W serves as a transition camera and the first camera U serves as a target camera.

At the second moment, both of the first camera U and the second camera W are in the operating state. The mobile phone sets the second camera W as the transition camera and sets the first camera U as the target camera.

In Block 1008, the second camera W is set as the camera configured to acquire the preview image.

When the third camera T has yet not been loaded to the operating state, the mobile phone uses the second camera W as the transition camera to replace the third camera T and sets the second camera W as the camera configured to acquire the preview image to focus the preview image through the focusing algorithm.

The mobile phone displays the preview picture on the display screen by use of the preview image acquired by the second camera W.

In Block 1009, the first camera U is unloaded from the operating state to the non-operating state and the third camera T is loaded from the non-operating state to the operating state.

In Block 1010, the camera configured to acquire the preview image is switched from the second camera W to the third camera T.

When the third camera T is in the operating state, the mobile phone sets the third camera T as the camera configured to acquire the preview image to focus the preview image through the focusing algorithm.

The mobile phone switches the preview image acquired by the second camera W to the preview image acquired by the third camera T and displays the preview picture on the display screen to implement a smooth zooming process. As shown in FIG. 13, it is described in stage ④ in FIG. 13 that, when the expected magnification reaches 2×, the third camera T is selected as the camera which will be used firstly.

In Block 1011, during zooming from the third magnification range to the adjacent fourth magnification range, the fourth camera F corresponding to the fourth magnification range is selected from the four cameras.

There is made such a hypothesis that a moment when the preview picture after zooming from the second magnification range to the adjacent third magnification range is displayed is a third moment.

At the third moment, if the expected magnification gradually increases from 2× but does not reach 5×, the mobile phone determines that the expected magnification is matched with the third magnification range, thereby selecting the third camera T as the camera which will be used firstly, and the mobile phone sets the third camera T as the camera acquiring the preview image. The mobile phone displays the preview picture on the display screen according to the preview image acquired by the third camera T.

If the expected magnification gradually increases from 2× and reaches 5×, the mobile phone determines that the expected magnification is matched with the fourth magnification range, thereby selecting the fourth camera F as the camera which will be used firstly. As shown in FIG. 13, the third moment corresponds to stage ⑤ in FIG. 13.

In Block 1012, whether the fourth camera F is in the operating state or not is detected.

The mobile phone reads the operating state value of each camera, the operating state value being configured to represent the operating state of each camera. In some embodiments, when the mobile phone determines according to the operating state value that the fourth camera F is in the non-operating state, Block 1013 is performed.

In Block 1013, when the fourth camera F is in the non-operating state, it is determined that, in two cameras in the operating state, the second camera W serves as the transition camera and the third camera T serves as the target camera.

At the third moment, both of the third camera T and the second camera W are in the operating state. The mobile phone sets the second camera W as the transition camera and sets the third camera T as the target camera.

In Block 1014, the second camera W is set as the camera configured to acquire the preview image.

When the fourth camera F has yet not been loaded to the operating state, the mobile phone uses the second camera W as the transition camera to replace the fourth camera F and sets the second camera W as the camera configured to acquire the preview image to focus the preview image through the focusing algorithm.

The mobile phone displays the preview picture on the display screen by use of the preview image acquired by the second camera W.

In Block 1015, the third camera T is unloaded from the operating state to the non-operating state and the fourth camera F is loaded from the non-operating state to the operating state.

In Block 1016, the camera configured to acquire the preview image is switched from the second camera W to the fourth camera F.

When the fourth camera F is in the operating state, the mobile phone sets the fourth camera F as the camera configured to acquire the preview image to focus the preview image through the focusing algorithm.

The mobile phone switches the preview image acquired by the second camera W to the preview image acquired by the fourth camera F and displays the preview picture on the display screen to implement the smooth zooming process. As shown in FIG. 13, it is described in stage ⑥ in FIG. 13 that, when the expected magnification reaches 5×, the fourth camera F is selected as the camera which will be used firstly.

Figure 14:
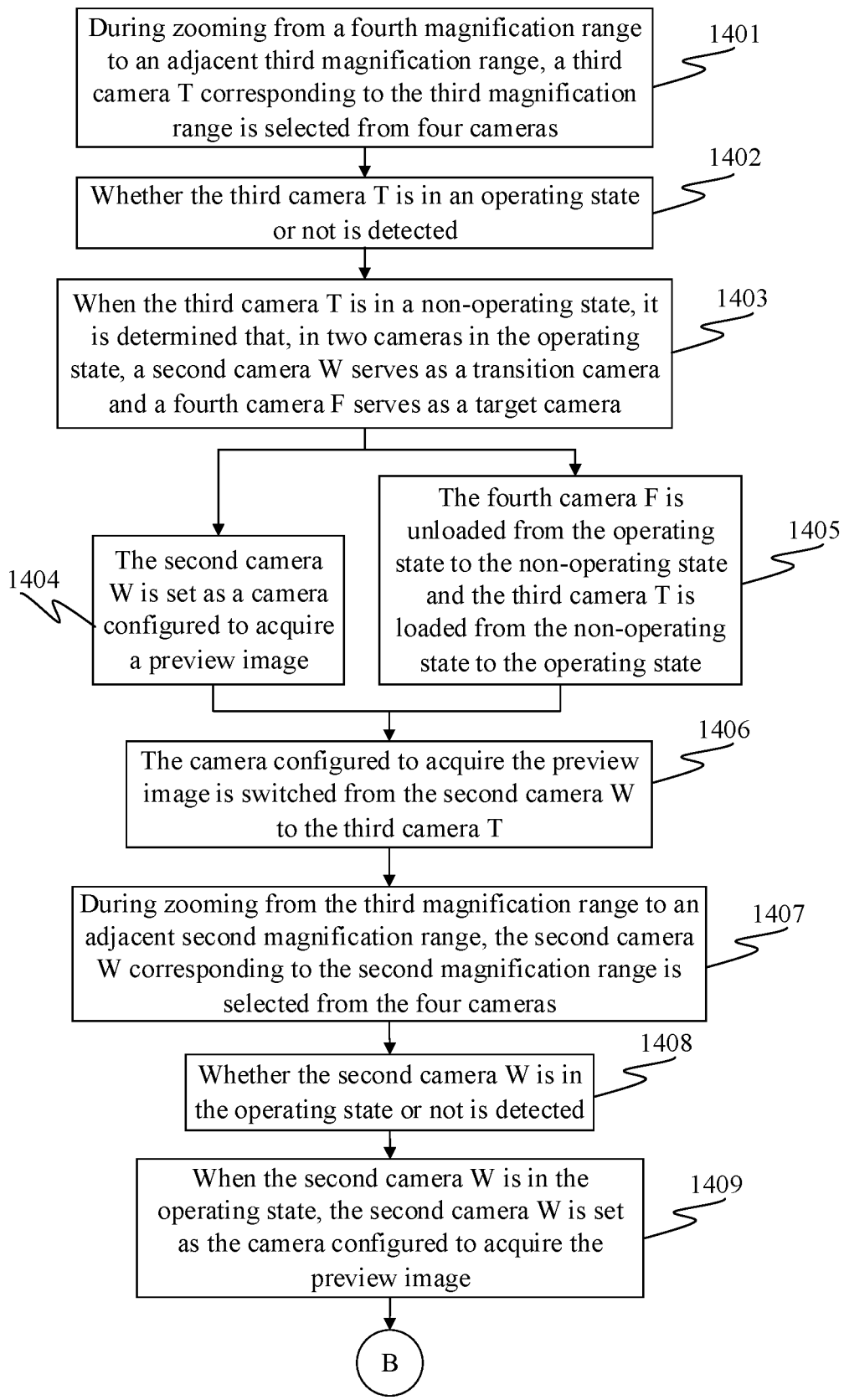
FIG. 14 is a flowchart of a method for zooming from a maximum magnification range to a minimum magnification range in a multi-camera scenario, according to some embodiments of the present disclosure.

Correspondingly, FIG. 14 is a flowchart of a method for zooming from a maximum magnification range to a minimum magnification range in a multi-camera scenario, according to some embodiments of the present disclosure. The method is as follows.

In Block 1401, during zooming from the fourth magnification range to the adjacent third magnification range, the third camera T corresponding to the third magnification range is selected from the four cameras.

There is made such a hypothesis that a moment when the preview picture after zooming from the fourth magnification range to the adjacent third magnification range is displayed is a fourth moment.

At the fourth moment, if the fingers of the user are closed on the preview picture, the expected magnification displayed on the shooting interface of the mobile phone decreases and the data scale decreases. The mobile phone acquires the triggering signal according to the action of the fingers of the user and the mobile phone processes the triggering signal to obtain the zooming instruction and obtains the expected magnification according to the zooming instruction. If the expected magnification gradually decreases from 5× but does not reach 2×, the mobile phone determines that the expected magnification is matched with the fourth magnification range, thereby selecting the fourth camera F as the camera which will be used firstly, and the mobile phone sets the fourth camera F as the camera acquiring the preview image. The mobile phone displays the preview picture on the display screen according to the preview image acquired by the fourth camera F.

If the expected magnification gradually decreases from 5× and reaches 2×, the mobile phone determines that the expected magnification is matched with the third magnification range, thereby selecting the third camera T as the camera which will be used firstly.

In Block 1402, whether the third camera T is in the operating state or not is detected.

The mobile phone reads the operating state value of each camera, the operating state value being configured to represent the operating state of each camera. In some embodiments, when the mobile phone determines according to the operating state value that the third camera T is in the non-operating state, Block 1403 is performed.

In Block 1403, when the third camera T is in the non-operating state, it is determined that, in two cameras in the operating state, the second camera W serves as the transition camera and the fourth camera F serves as the target camera.

At the fourth moment, both of the fourth camera F and the second camera W are in the operating state. The mobile phone sets the second camera W as the transition camera and sets the fourth camera F as the target camera.

In Block 1404, the second camera W is set as the camera configured to acquire the preview image.

When the third camera T has yet not been loaded to the operating state, the mobile phone uses the second camera W as the transition camera to replace the third camera T and sets the second camera W as the camera configured to acquire the preview image to focus the preview image through the focusing algorithm.

The mobile phone displays the preview picture on the display screen by use of the preview image acquired by the second camera W.

In Block 1405, the fourth camera F is unloaded from the operating state to the non-operating state and the third camera T is loaded from the non-operating state to the operating state.

In Block 1406, the camera configured to acquire the preview image is switched from the second camera W to the third camera T.

When the third camera T is in the operating state, the mobile phone sets the third camera T as the camera configured to acquire the preview image to focus the preview image through the focusing algorithm.

The mobile phone switches the preview image acquired by the second camera W to the preview image acquired by the third camera T and displays the preview picture on the display screen to implement the smooth zooming process.

In Block 1407, during zooming from the third magnification range to the adjacent second magnification range, the second camera W corresponding to the second magnification range is selected from the four cameras.

There is made such a hypothesis that a moment when the preview picture after zooming from the third magnification range to the adjacent second magnification range is displayed is a fifth moment.

At the fifth moment, if the expected magnification gradually decreases from 2× but does not reach 1×, the mobile phone determines that the expected magnification is matched with the third magnification range, thereby selecting the third camera T as the camera which will be used firstly, and the mobile phone sets the third camera T as the camera acquiring the preview image. The mobile phone displays the preview picture on the display screen according to the preview image acquired by the third camera T.

If the expected magnification gradually decreases from 2× and reaches 1×, the mobile phone determines that the expected magnification is matched with the second magnification range, thereby selecting the second camera W as the camera which will be used firstly.

In Block 1408, whether the second camera W is in the operating state or not is detected.

The mobile phone reads the operating state value of each camera, the operating state value being configured to represent the operating state of each camera. In some embodiments, when the mobile phone determines according to the operating state value that the second camera W is in the operating state, Block 1409 is performed.

In Block 1409, when the second camera W is in the operating state, the second camera W is set as the camera configured to acquire the preview image.

When the second camera W is in the operating state, the mobile phone sets the second camera W as the camera configured to acquire the preview image to focus the preview image through the focusing algorithm. The mobile phone displays the preview picture on the display screen according to the preview image acquired by the second camera W.

Figure 15:
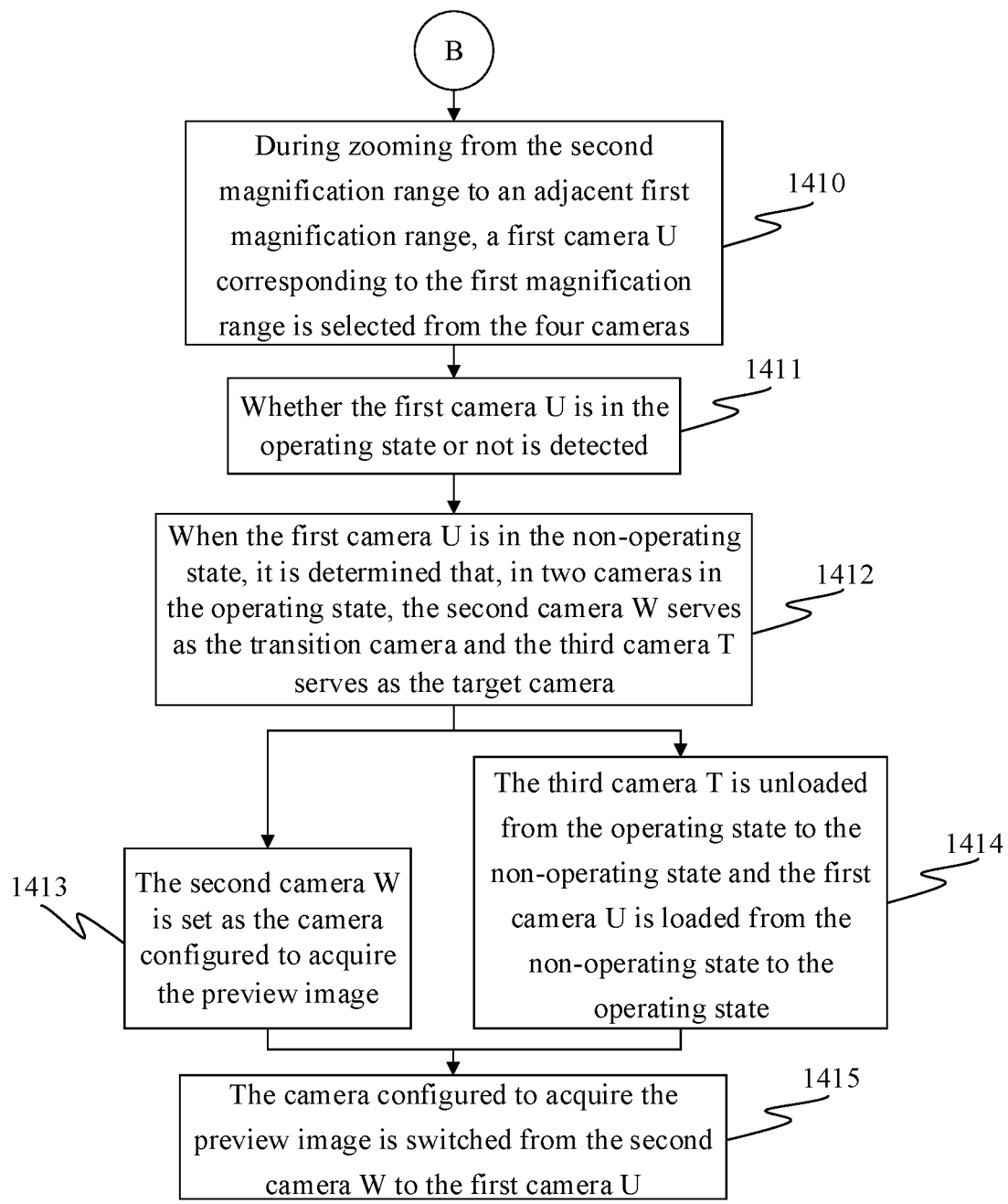
FIG. 15 is a flowchart of a method for zooming from a maximum magnification range to a minimum magnification range in a multi-camera scenario, according to some embodiments of the present disclosure.

FIG. 15 is a flowchart of a method for zooming from a maximum magnification range to a minimum magnification range in a multi-camera scenario, according to some embodiments of the present disclosure. In the method, zooming to the minimum magnification range is continued after the abovementioned blocks. The method is as follows.

In Block 1410, during zooming from the second magnification range to the adjacent first magnification range, the first camera U corresponding to the first magnification range is selected from the four cameras.

There is made such a hypothesis that a moment when the preview picture after zooming from the second magnification range to the adjacent first magnification range is displayed is a sixth moment.

At the sixth moment, if the expected magnification gradually decreases from 2× but does not reach 1×, the mobile phone determines that the expected magnification is matched with the second magnification range, thereby selecting the second camera W as the camera which will be used firstly, and the mobile phone sets the second camera W as the camera acquiring the preview image. The mobile phone displays the preview picture on the display screen according to the preview image acquired by the second camera W.

If the expected magnification gradually decreases from 2× and reaches 1×, the mobile phone determines that the expected magnification is matched with the first magnification range, thereby selecting the first camera U as the camera which will be used firstly.

In Block 1411, whether the first camera U is in the operating state or not is detected.

The mobile phone reads the operating state value of each camera, the operating state value being configured to represent the operating state of each camera. In some embodiments, when the mobile phone determines according to the operating state value that the first camera U is in the non-operating state, Block 1412 is performed.

In Block 1412, when the first camera U is in the non-operating state, it is determined that, in two cameras in the operating state, the second camera W serves as the transition camera and the third camera T serves as the target camera.

At the sixth moment, both of the third camera T and the second camera W are in the operating state. The mobile phone sets the second camera W as the transition camera and sets the third camera T as the target camera.

In Block 1413, the second camera W is set as the camera configured to acquire the preview image.

When the first camera U has yet not been loaded to the operating state, the mobile phone uses the second camera W as the transition camera to replace the first camera U and sets the second camera W as the camera configured to acquire the preview image to focus the preview image through the focusing algorithm.

The mobile phone displays the preview picture on the display screen by use of the preview image acquired by the second camera W.

In Block 1414, the third camera T is unloaded from the operating state to the non-operating state and the first camera U is loaded from the non-operating state to the operating state.

In Block 1415, the camera configured to acquire the preview image is switched from the second camera W to the first camera U.

When the first camera U is in the operating state, the mobile phone sets the first camera U as the camera configured to acquire the preview image to focus the preview image through the focusing algorithm.

The mobile phone switches the preview image acquired by the second camera W to the preview image acquired by the first camera U and displays the preview picture on the display screen to implement the smooth zooming process.

From the above, in the method provided in the embodiment, the mobile phone uses the first camera U as the transition camera acquiring the preview image, unloads the target camera to the non-operating state, loads the camera corresponding to the expected magnification to the operating state and switches the camera configured to acquire the preview image from the first camera U to the camera corresponding to the expected magnification. In such a manner, when the image processor only supports the 2 cameras in the operating state simultaneously, the 4 cameras are dynamically switched according to a zooming requirement, so that hardware limit of the image processor is extended and a sudden change in a preview picture in a zooming process is avoided. Therefore, smooth switching of multiple cameras in the zooming process is implemented.

The below is a device embodiment of the present disclosure and can be configured to execute the method embodiment of the present disclosure. Details undisclosed in the device embodiment of the present disclosure refer to the method embodiment of the present disclosure.

In some embodiments of the present disclosure, multiple cameras in a terminal zoom according to an application scenario, a corresponding camera is selected according to a zooming magnification range and the corresponding camera is adopted to acquire a preview image.

Figure 16:
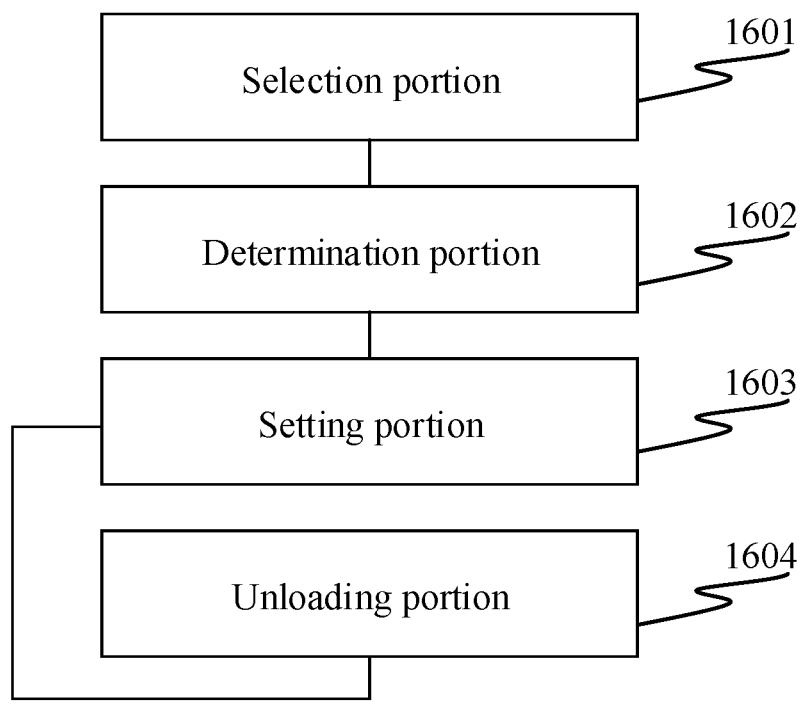
FIG. 16 is a schematic diagram illustrating a multi-camera zooming device, according to some embodiments of the present disclosure.

FIG. 16 is a schematic diagram illustrating a multi-camera zooming device, according to some embodiments of the present disclosure. The device is applied to a mobile terminal, the mobile terminal includes n cameras and an image processor connected with the n cameras and the image processor simultaneously supports m cameras in an operating state, where n>m≥2. The device includes the following portions.

A selection portion 1601, which is configured to, during zooming from an i-th magnification range to an adjacent j-th magnification range, select a j-th camera corresponding to the j-th magnification range from the n cameras, where 1≤i≤n and 1≤j≤n.

Zooming from the i-th magnification range to the adjacent j-th magnification range can refer to zooming from low to high magnification ranges, that is, the j-th magnification range is an (i+1)th magnification range, and can also refer to zooming from the high to low magnification ranges, that is, the j-th magnification range is an (i−1)th magnification range.

The n cameras have different physical performance and have corresponding physical magnification ranges and the physical magnification ranges of the n cameras can be intersected. Therefore, software magnification ranges of the n cameras are set through software. During zooming, the mobile terminal can acquire an expected magnification which is a specified expected zooming magnification, and can determine the magnification range matched with the expected magnification to select the camera which will be used firstly.

If the j-th magnification range is not reached during zooming from the i-th magnification range to the adjacent j-th magnification range, the mobile terminal acquires the expected magnification and determines that the expected magnification is matched with the i-th magnification range according to the expected magnification, thereby setting an i-th camera as a camera acquiring a preview image, and the mobile terminal displays a preview picture on a display screen of the mobile terminal according to the preview image acquired by the i-th camera.

If the j-th magnification range is reached during zooming from the i-th magnification range to the adjacent j-th magnification range, the mobile terminal acquires the expected magnification and determines that the expected magnification is matched with the j-th magnification range according to the expected magnification, thereby selecting the j-th camera as the camera which will be used firstly.

A determination portion 1602, which is configured to, when the j-th camera is in an operating state, set the j-th camera as a camera configured to acquire a preview image.

When the j-th camera is in the operating state, the mobile terminal sets the j-th camera as the camera configured to acquire the preview image to focus the preview image through a focusing algorithm. The mobile terminal displays the preview picture on the display screen according to the preview image acquired by the j-th camera.

The determination portion 1602 is further configured to, when the j-th camera is in a non-operating state, determine a transition camera and target camera from m cameras in the operating state.

The transition camera is configured as follows. When the j-th camera has yet not been loaded to the operating state, the mobile terminal uses the transition camera to replace the j-th camera and sets the transition camera as the camera configured to acquire the preview image to focus the preview image through the focusing algorithm.

The target camera is configured as follows. Under a hardware condition limit, the mobile terminal unloads the target camera in the operating state to the non-operating state to vacate a data path, then loads the j-th camera from the non-operating state to the operating state and sets the j-th camera as the camera configured to acquire the preview image to focus the preview image through the focusing algorithm.

A setting portion 1603, which is configured to set the transition camera as the camera configured to acquire the preview image.

When the j-th camera has yet not been loaded to the operating state, the mobile terminal uses the transition camera to replace the j-th camera and sets the transition camera as the camera configured to acquire the preview image to focus the preview image through the focusing algorithm.

The mobile terminal displays the preview picture on the display screen by use of the preview image acquired by the transition camera.

An unloading portion 1604, which is configured to unload the target camera from the operating state to the non-operating state and load the j-th camera from the non-operating state to the operating state.

The setting portion 1603 is configured to switch the camera configured to acquire the preview image from the transition camera to the j-th camera.

When the j-th camera is in the operating state, the mobile terminal sets the j-th camera as the camera configured to acquire the preview image to focus the preview image through the focusing algorithm.

The mobile phone switches the preview image acquired by the transition camera to the preview image acquired by the j-th camera and displays the preview picture on the display screen to implement a smooth zooming process.

From the above, in the device provided by the embodiment, the transition camera is used as a temporary camera configured to acquire the preview image, meanwhile, the target camera is unloaded to the non-operating state, the j-th camera is loaded to the operating state and the camera configured to acquire the preview image is switched from the transition camera to the j-th camera. In such a manner, when the image processor only supports the m cameras in the operating state simultaneously, the n cameras are dynamically switched according to a zooming requirement, so that hardware limit of the image processor is extended and a sudden change in a preview picture in a zooming process is avoided. Therefore, smooth switching of multiple cameras in the zooming process is implemented.

In some alternative embodiments based on FIG. 16, a possible implementation that the determination portion 1602 determines the transition camera and target camera from the m cameras in the operating state is as follows.

The determination portion 1602 is configured to determine a default camera from the m cameras in the operating state as the transition camera.

The determination portion 1602 is configured to determine an i-th camera, corresponding to the i-th magnification range, from the m cameras in the operating state as the transition camera.

When m=2, the determination portion is configured to determine the other camera, other than the transition camera, from the m cameras in the operating state as the target camera.

The mobile terminal includes a first camera U, a second camera W, a third camera T and a fourth camera F.

During zooming from a second magnification range to a third magnification range, the j-th camera is the third camera T, the transition camera is the second camera W and the target camera is the first camera U; and during zooming from the third magnification range to a fourth magnification range, the j-th camera is the fourth camera F, the transition camera is the second camera W and the target camera is the third camera T.

During zooming from the fourth magnification range to the third magnification range, the j-th camera is the third camera T, the transition camera is the second camera W and the target camera is the fourth camera F; and during zooming from the second magnification range to a first magnification range, the j-th camera is the first camera U, the transition camera is the second camera W and the target camera is the third camera T.

Herein, the first magnification range corresponds to the first camera U, the second magnification range corresponds to the second camera W, the third magnification range corresponds to the third camera T and the fourth magnification range corresponds to the fourth camera F.

When m is an integer larger than 2, the determination portion 1602 is configured to determine the camera loaded earliest from the m-1 cameras in the operating state, other than the transition camera, as the target camera.

When m is an integer larger than 2, each camera corresponds to a respective magnification range, and the determination portion 1602 is configured to determine the camera, of which the magnification range is farthest from the j-th magnification range, from the m-1 cameras in the operating state, other than the transition camera, as the target camera.

From the above, in the device provided by the embodiment, the transition camera is used as the temporary camera configured to acquire the preview image, meanwhile, the target camera is unloaded to the non-operating state, the j-th camera is loaded to the operating state and the camera configured to acquire the preview image is switched from the transition camera to the j-th camera. In such a manner, when the image processor only supports the m cameras in the operating state simultaneously, the n cameras are dynamically switched according to a zooming requirement, so that hardware limit of the image processor is extended and a sudden change in a preview picture in a zooming process is avoided. Therefore, smooth switching of multiple cameras in the zooming process is implemented.

In the device provided by the embodiment, under the hardware condition limit, the mobile terminal simultaneously supports the m cameras in the operating state and determines the default camera as the transition camera. The default camera can serve as the main camera and can provide the preview image on the display screen of the mobile terminal during zooming of the mobile terminal, thereby avoiding the sudden change phenomenon of the preview picture during zooming of the mobile terminal.

In the device provided by the embodiment, under the hardware condition limit, the mobile terminal simultaneously supports the two cameras in the operating state and determines the i-th camera corresponding to the i-th magnification range as the transition camera. The transition camera can provide the preview image on the display screen of the mobile terminal during zooming of the mobile terminal, thereby avoiding the sudden change phenomenon of the preview picture during zooming of the mobile terminal.

In the method provided by the embodiment, the mobile terminal determines the target camera from the left m-1 cameras in the operating state, the target camera being the camera loaded earliest. There is a high probability that the camera loaded earliest is inapplicable to the practical application scenario after zooming of the mobile terminal, so that it can serve as the target camera.

In the method provided by the embodiment, the mobile terminal determines the target camera from the left m-1 cameras in the operating state, the target camera being the camera farthest from the j-th magnification range. There is a high probability that the camera farthest from the j-th magnification range is inapplicable to the practical application scenario, so that it can serve as the target camera.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It is to be understood that "multiple" mentioned in the present disclosure refers to two or more than two. "And/or" describes an association relationship of associated objects and represents that three relationships can exist. For example, A and/or B can represent three conditions, i.e., independent existence of A, coexistence of A and B and independent existence of B. Character "/" usually represents that previous and next associated objects form an "or" relationship.

The above is only the preferred embodiment of the present disclosure and not intended to limit the present disclosure. Any modifications, equivalent replacements, improvements and the like made within the spirit and principle of the present disclosure shall fall within the scope of protection of the present disclosure.

The invention claimed is:

1. A multi-camera zooming method, applied to a mobile terminal, the mobile terminal including n cameras and an image processor coupled with the n cameras, and the image processor simultaneously supporting m cameras in an operating state, where n and m are integers and n>m≥2, the method comprising:
during zooming from an i-th magnification range to an adjacent j-th magnification range, selecting a j-th camera corresponding to the j-th magnification range from the n cameras, where 1≤i≤n and 1≤j≤n;
when the j-th camera is in a non-operating state, determining a transition camera and target camera from the m cameras in the operating state;
setting the transition camera as a camera configured to acquire a preview image;
unloading the target camera from the operating state to the non-operating state and loading the j-th camera from the non-operating state to the operating state; and
switching the camera configured to acquire the preview image from the transition camera to the j-th camera,
wherein
in a case that m is an integer larger than 2, the determining the transition camera and the target camera from the m cameras in the operating state comprises:
determining a main camera from the m cameras in the operating state as the transition camera, wherein the main camera defaults to serve as the transition camera, and determining a camera from the m-1 cameras in the operating state, other than the transition camera as the target camera,
and
in a case that m=2, and the mobile terminal includes a first camera U, a second camera W, a third camera T and a fourth camera F; during zooming from a second magnification range to a third magnification range, the j-th camera is the third camera T, the transition camera is the second camera W and the target camera is the first camera U; during zooming from the third magnification range to a fourth magnification range, the j-th camera is the fourth camera F, the transition camera is the second camera W and the target camera is the third camera T; wherein the second magnification range corresponds to the second camera W, the third magnification range corresponds to the third camera T and the fourth magnification range corresponds to the fourth camera F.

2. The method of claim 1, wherein
during zooming from the fourth magnification range to the third magnification range, the j-th camera is the third camera T, the transition camera is the second camera W and the target camera is the fourth camera F;
during zooming from the second magnification range to a first magnification range, the j-th camera is the first camera U, the transition camera is the second camera W and the target camera is the third camera T;
wherein the first magnification range corresponds to the first camera U.

3. The method of claim 2, wherein:
the first camera U is an ultra-wide-angle camera and corresponds to the first magnification range;
the second camera W is a wide-angle camera and corresponds to the second magnification range;
the third camera T is a telephoto camera and corresponds to the third magnification range; and
the fourth camera F is a super telephoto camera and corresponds to the fourth magnification range.

4. The method of claim 2, wherein:
the first camera U is an ultra-wide-angle camera and corresponds to the first magnification range of [0.6$x$, l$x$);
the second camera W is a wide-angle camera and corresponds to the second magnification range of [l$x$, 2$x$);
the third camera T is a telephoto camera and corresponds to the third magnification range of [2$x$, 5$x$); and
the fourth camera F is a super telephoto camera and corresponds to the fourth magnification range of 5 $x$.

5. The method of claim 1, wherein when m is an integer larger than 2, and the determining a camera from the m-1 cameras in the operating state, other than the transition camera as the target camera includes:

determining, as the target camera, a camera loaded earliest from the m-1 cameras in the operating state other than the transition camera.

6. The method of claim 1, wherein when m is an integer larger than 2, each camera corresponds to a respective magnification range and determining a camera from the m-1 cameras in the operating state, other than the transition camera as the target camera includes:
determining, as the target camera, a camera, of which the magnification range is farthest from the j-th magnification range, from the m-1 cameras in the operating state other than the transition camera.

7. A mobile terminal, the mobile terminal including n cameras and an image processor connected with the n cameras, and the image processor simultaneously supporting m cameras in an operating state, where n and m are integers and n>m≥2, the image processor is configured to:
during zooming from an i-th magnification range to an adjacent j-th magnification range, select a j-th camera corresponding to the j-th magnification range from the n cameras, where 1<i≤n and 1≤j ≤n;
when the j-th camera is in a non-operating state, determine a transition camera and target camera from the m cameras in the operating state;
set the transition camera as a camera configured to acquire a preview image;
unload the target camera from the operating state to the non-operating state and load the j-th camera from the non-operating state to the operating state; and
switch the camera configured to acquire the preview image from the transition camera to the j-th camera;
wherein
in a case that m is an integer larger than 2, the image processor is further configured to: determine a main camera from the m cameras in the operating state as the transition camera, the main camera defaults to serve as the transition camera; and
determine a camera from the m-1 cameras in the operating state, other than the transition camera as the target camera,
or
in a case that m=2 and the mobile terminal includes a first camera U, a second camera W, a third camera T and a fourth camera F; during zooming from a second magnification range to a third magnification range, the j-th camera is the third camera T, the transition camera is the second camera W and the target camera is the first camera U; during zooming from the third magnification range to a fourth magnification range, the j-th camera is the fourth camera F, the transition camera is the second camera W and the target camera is the third camera T; wherein the second magnification range corresponds to the second camera W, the third magnification range corresponds to the third camera T and the fourth magnification range corresponds to the fourth camera F.

8. The mobile terminal of claim 7, wherein
during zooming from the fourth magnification range to the third magnification range, the j-th camera is the third camera T, the transition camera is the second camera W and the target camera is the fourth camera F;
during zooming from the second magnification range to a first magnification range, the j-th camera is the first camera U, the transition camera is the second camera W and the target camera is the third camera T;
wherein the first magnification range corresponds to the first camera U.

9. The mobile terminal of claim 8, wherein:
the first camera U is an ultra-wide-angle camera and corresponds to the first magnification range;
the second camera W is a wide-angle camera and corresponds to the second magnification range;
the third camera T is a telephoto camera and corresponds to the third magnification range; and
the fourth camera F is a super telephoto camera and corresponds to the fourth magnification range.

10. The mobile terminal of claim 8, wherein:
the first camera U is an ultra-wide-angle camera and corresponds to the first magnification range of [$0.6x$, $1x$);
the second camera W is a wide-angle camera and corresponds to the second magnification range of [$1x$, $2x$);
the third camera T is a telephoto camera and corresponds to the third magnification range of [$2x$, $5x$); and
the fourth camera F is a super telephoto camera and corresponds to the fourth magnification range of 5 x.

11. The mobile terminal of claim 7, wherein when m is an integer larger than 2 and
the image processor is further configured to determine, as the target camera, a camera loaded earliest from the m-1 cameras in the operating state other than the transition camera.

12. The mobile terminal of claim 7, wherein when m is an integer larger than 2, each camera corresponds to a respective magnification range and
the image processor is further configured to determine, as the target camera, a camera, of which the magnification range is farthest from the j-th magnification range, from the m-1 cameras in the operating state other than the transition camera.

13. A non-transitory computer-readable storage medium having stored thereon at least one instruction, which is loaded and executed by a processor to implement the multi-camera zooming method, the multi-camera zooming method applied to a mobile terminal, the mobile terminal including n cameras and an image processor connected with the n cameras, and the image processor simultaneously supporting m cameras in an operating state, where n and m are integers and n>m≥2 the method including:
during zooming from an i-th magnification range to an adjacent j-th magnification range, selecting a j-th camera corresponding to the j-th magnification range from the n cameras, where 1<i≤n and 1≤j ≤n;
when the j-th camera is in a non-operating state, determining a transition camera and target camera from the m cameras in the operating state;
setting the transition camera as a camera configured to acquire a preview image;
unloading the target camera from the operating state to the non-operating state and loading the j-th camera from the non-operating state to the operating state; and
switching the camera configured to acquire the preview image from the transition camera to the j-th camera,
wherein
in a case that m is an integer larger than 2, the determining the transition camera and the target camera from the m cameras in the operating state comprises:
determining a main camera from the m cameras in the operating state as the transition camera, the main camera defaults to serve as the transition camera, and determining a camera from the m-1 cameras in the operating state, other than the transition camera as the target camera,
and in a case that m=2, and the mobile terminal includes a first camera U, a second camera W, a third camera T and a fourth camera F; during zooming from a second magnification range to a third magnification range, the j-th camera is the third camera T, the transition camera is the second camera W and the target camera is the first camera U; during zooming from the third magnification range to a fourth magnification range, the j-th camera is the fourth camera F, the transition camera is the second camera W and the target camera is the third camera T; wherein the second magnification range corresponds to the second camera W, the third magnification range corresponds to the third camera T and the fourth magnification range corresponds to the fourth camera F.

14. The non-transitory computer-readable storage medium of claim 13, wherein when m=2, and the determining the target camera from the m cameras in the operating state comprises:

during zooming from the fourth magnification range to the third magnification range, the j-th camera is the third camera T, the transition camera is the second camera W and the target camera is the fourth camera F;

during zooming from the second magnification range to a first magnification range, the j-th camera is the first camera U, the transition camera is the second camera W and the target camera is the third camera T;

wherein the first magnification range corresponds to the first camera U.

15. The non-transitory computer-readable storage medium of claim 14, wherein:

the first camera U is an ultra-wide-angle camera and corresponds to the first magnification range of [0.6$x$, l$x$);

the second camera W is a wide-angle camera and corresponds to the second magnification range of [l$x$, 2$x$);

the third camera T is a telephoto camera and corresponds to the third magnification range of [2$x$, 5$x$); and the fourth camera F is a super telephoto camera and corresponds to the fourth magnification range of 5 $x$.

* * * * *